United States Patent
Templeton et al.

(10) Patent No.: US 10,790,500 B2
(45) Date of Patent: Sep. 29, 2020

(54) SULFUR-CARBON TUBES AND/OR SPHERES, AND METHODS OF MAKING SAME

(71) Applicant: THE REGENTS OF THE UNIVERSITY OF COLORADO, A BODY CORPORATE, Denver, CO (US)

(72) Inventors: Alexis Templeton, Boulder, CO (US); Julie Cosmidis, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 297 days.

(21) Appl. No.: 15/753,106

(22) PCT Filed: Aug. 16, 2016

(86) PCT No.: PCT/US2016/047180
§ 371 (c)(1),
(2) Date: Feb. 15, 2018

(87) PCT Pub. No.: WO2017/078824
PCT Pub. Date: May 11, 2017

(65) Prior Publication Data
US 2019/0363346 A1 Nov. 28, 2019

Related U.S. Application Data

(60) Provisional application No. 62/205,960, filed on Aug. 17, 2015.

(51) Int. Cl.
| | | |
|---|---|---|
| *H01M 4/1397* | (2010.01) |
| *C01B 32/05* | (2017.01) |
| *C01B 17/40* | (2006.01) |
| *H01M 4/136* | (2010.01) |
| *H01M 4/36* | (2006.01) |
| *H01M 4/38* | (2006.01) |
| *H01M 4/62* | (2006.01) |
| *H01M 10/052* | (2010.01) |
| *H01M 4/02* | (2006.01) |

(52) U.S. Cl.
CPC .......... *H01M 4/1397* (2013.01); *C01B 17/40* (2013.01); *C01B 32/05* (2017.08); *H01M 4/136* (2013.01); *H01M 4/364* (2013.01); *H01M 4/38* (2013.01); *H01M 4/625* (2013.01); *H01M 10/052* (2013.01); *C01P 2002/01* (2013.01); *C01P 2002/54* (2013.01); *C01P 2002/82* (2013.01); *C01P 2004/03* (2013.01); *C01P 2004/32* (2013.01); *C01P 2006/40* (2013.01); *H01M 2004/028* (2013.01)

(58) Field of Classification Search
CPC .................................................... H01M 4/136
See application file for complete search history.

(56) References Cited

U.S. PATENT DOCUMENTS

2014/0342234 A1  11/2014  Guo et al.

OTHER PUBLICATIONS

Cosmidis, J. et al., Self-Assembly of Biomorphic Carbon/Sulfur Microstructures in Sulfidic Environments, Nature Communications, vol. 7, Article 12812, 2016, pp. 1-9.
Li, Jie et al., Mesoporous Carbon from Biomass: One-Pot Synthesis and Application for Li-S Batteries, J. Mater. Chem. A., vol. 2, 2014, pp. 13916-13922.
Li, Z. et al., Status and Prospects in Sulfur-Carbon Composite as Cathode Materials for Rechargeable Lithium-Sulfur Batteries, Carbon, vol. 92, 2015, pp. 41-63.
Wang, et al., Carbon-sulfur Composites for Li-S Batteries: Status and Prospects, J Mat Chem A, vol. 1, 2013, pp. 9382-9394.
Yu, L. et al., Hydrothermal Nanocasting: Synthesis of Hierarchically Porous Carbon Monoliths and Their Application in Lithium-Sulfur Batteries, Carbon, vol. 61, 2013, pp. 245-253.
Zhang, L. et al., Preparation of a Macroscopic, Robust Carbon-Fiber Monolith from Filamentous Fungi and Its Application in Li—S Batteries, Green Chem, vol. 16, 2014, pp. 3926-3934.

*Primary Examiner* — Peter F Godenschwager
(74) *Attorney, Agent, or Firm* — Saul Ewing Arnstein & Lehr LLP; Kathryn Doyle; Domingos J. Silva

(57) ABSTRACT

The invention provides methods of preparing carbon/sulfur composites. In certain embodiments, the composites comprise multidimensional carbon tubular and/or spherical networks loaded with elemental sulfur, as well as compositions comprising such composites.

20 Claims, 24 Drawing Sheets

FIG. 1A
FIG. 1B
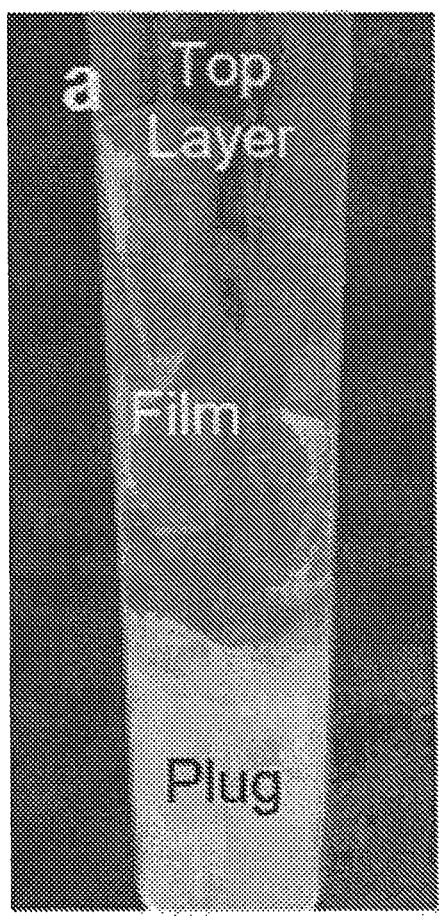
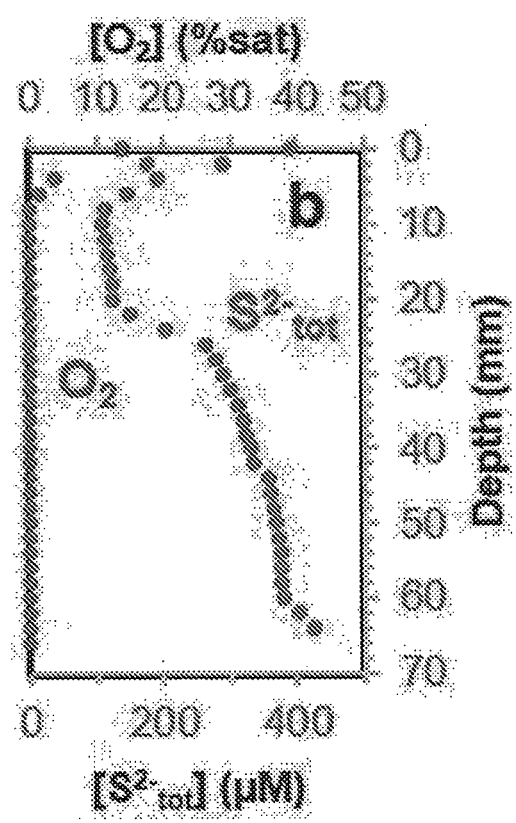

Yeast extract (2 g/L) + Peptone (10 g/L)

Long (up to a few 100 μm), rigid, thick, branched tubular filaments (sulfur carbon tubes = SCT)

Yeast extract (2 g/L) + Peptone (10 g/L)

Long (up to a few 100 um), rigid, thick, branched tubular filaments (sulfur carbon tubes = SCT)

Peptone (10 g/L)

*Long, rigid, thick, branched tubular filaments + thin flexible filaments*

Yeast Extract (2 g/L)

*Thin, flexible C/S filaments, organized in bundles*

Yeast Extract (2 g/L)

*Thin, flexible C/S filaments, organized in bundles*

Yeast Extract (5 g/L) + Peptone (5 g/L)

*Thin, organized, rigid tubular C/S filaments, organized in a perpendicular lattice*

Yeast extract (2 g/L) + Peptone (10 g/L)

Images at 15 days

*These are the SCT shown previously, as observed now by electron microscopy*

Yeast extract (2 g/L) + Peptone (10 g/L)

Images at 15 days     Back-scattered electron mode

Tubes = outlined
Sulfur = bright

Yeast Extract (2 g/L) — Tubes and spheres = outlined; Sulfur = bright
15 days — Back-scattered electron mode Yeast Extract (2 g/L) — Tubes and spheres = outlined; Sulfur = dark
20 days FIG. 8A
FIG. 8B
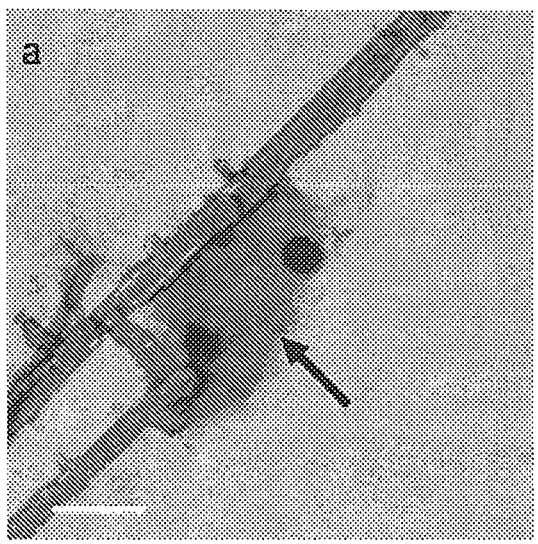 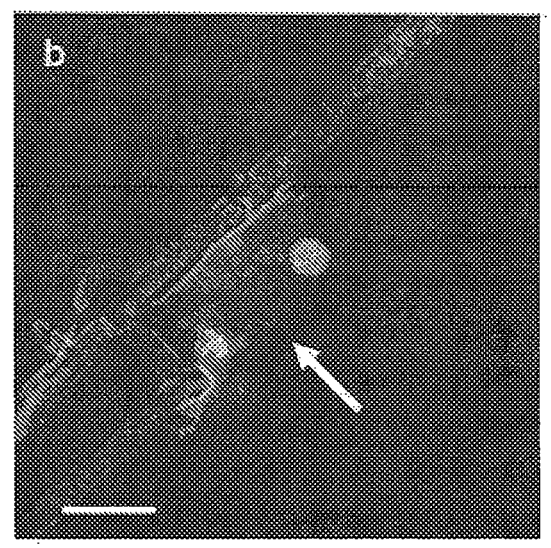
FIG. 8C
FIG. 8D
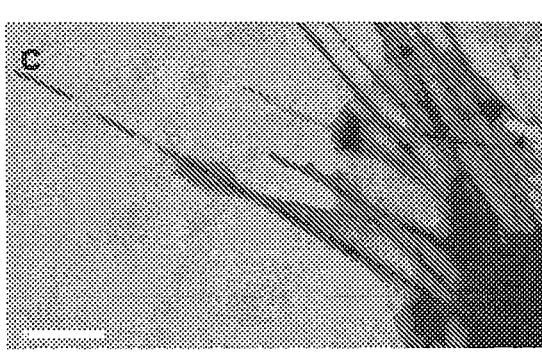 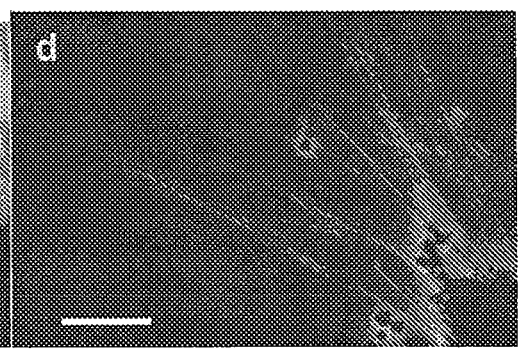

Yeast Extract (2 g/L), 11 days

Image @ 288.2 eV

OD(288.2 eV) − OD(280 eV)

Another form of imaging the C/S thin filaments, tubes and spheres (SCT and SCS)

Yeast Extract (2 g/L), 25 days

A form of imaging to show co-association of C and S

SULFUR-CARBON TUBES AND/OR SPHERES, AND METHODS OF MAKING SAME

CROSS-REFERENCE TO RELATED APPLICATIONS

This application is a 35 U.S.C. § 371 national phase application of, and claims priority to, International Application No. PCT/US2016/047180, filed Aug. 16, 2016, which claims priority under 35 U.S.C. § 119(e) to U.S. Provisional Application No. 62/205,960, filed Aug. 17, 2015, all of which applications are incorporated herein by reference in their entireties.

STATEMENT REGARDING FEDERALLY SPONSORED RESEARCH OR DEVELOPMENT

This invention was made with government support under grant number NNX13AJ32G awarded by NASA. The government has certain rights in the invention.

BACKGROUND OF THE INVENTION

Low-cost, environmentally friendly, high-energy density and long-lasting rechargeable batteries are urgently needed. Carbon materials, including activated carbon, nanoporous carbon, carbon nanotubes and graphene sheets, are useful electrode materials because of their diversity, robust chemistry, conductivity, stability and abundance. Such materials find application in supercapacitors, lithium ion batteries (anode materials) and lithium-air/oxygen batteries (gas diffusion cathodes). Carbon materials have good conductivity and mechanical resilience, and can be employed as insulating or semiconducting cathode materials (mainly lithium-transition metal oxides).

In particular, carbon materials are used in Li/S batteries, which comprise a lithium metal anode and a sulfur cathode. Due to their exceptionally high energy density, lithium-sulfur (Li—S) batteries are considered a promising successor to Li-ion batteries used in today's electronic portable devices. There has been intense research for the development of composite cathode materials for Li—S batteries, in which S is impregnated into a nano-structured carbon matrix, increasing its electrical conductivity. However, the spectrum of recently developed synthesis methods for such composites are complex and require several energy-intensive steps, which is a barrier for large-scale fabrication and commercial utilization.

Sulfur is a low cost, non-toxic and plentiful material, but must be used in combination with carbon (which is a conducting additive) in composite carbon-sulfur cathodes, because sulfur itself is insulating. Unfortunately, such carbon-sulfur composites are still far from ideal: intermediate formation of various sulfur-containing species in the cathode leads to active mass loss from the cathode, reduction of Coulombic efficiency, and capacity decay upon cycling; insulating $Li_2S_2/Li_2S$ deposits may form around the cathode; and volume variations may be observed due to formation of $Li_2S_2/Li_2S$. For example, a major issue for the commercialization of Li—S batteries is the degradation of the cathode material over many charge-discharge cycles. This is due to the internal diffusion of intermediate soluble Li-polysulfides during the electrochemical reactions between Li and S, causing a loss of active sulfur material at the cathode.

Thus Li—S batteries present several technical issues that are still hindering their practical realization, such as the low electrical conductivity of the sulfur composing the cathode of the batteries, the loss of material from the cathode over many charge-discharge cycles by formation of highly soluble Li-polysulfides intermediates, and volume expansion and morphological disruption of the sulfur cathode. Much of the recent R&D effort in the last decade has been focused on overcoming these drawbacks by developing new cathodes where sulfur is embedded within conductive carbon materials, which helps enhance the electrical conductivity of the cathode, limiting the dissoluble loss of intermediate sulfur species in the electrolyte solution, and accommodate volume changes There is thus a need in the art for novel carbon-sulfur composites and methods of making the same. The properties of such composites, such as sulfur loading and electrical conductivity, should be easily manipulated by changing the experimental conditions under which they are prepared. The present invention fulfills this need.

BRIEF SUMMARY OF THE INVENTION

The invention provides a method of preparing a carbon/sulfur composite, wherein the composite comprises multidimensional carbon tubular and/or spherical networks associated with elemental sulfur.

In certain embodiments, the method comprises contacting (i) a first layer comprising one or more soluble organic compounds and a salt solution and (ii) a second layer comprising a gel, a salt solution and one or more sulfide sources, wherein the second layer and optionally the first layer are substantially free of oxygen gas at the time of contacting. In other embodiments, the method comprises directly exposing the first layer to an atmosphere comprising oxygen gas, wherein the second layer is not directly exposed to an atmosphere comprising oxygen gas. In yet other embodiments, the method comprises allowing the first layer and the second layer to at least partially mix, and react in the presence of oxygen, thereby forming the composite.

In certain embodiments, the one or more soluble organic compounds are at least one selected from the group consisting of peptone, yeast extract, casamino acids, glucose, cellobiose, glycine and humic acids.

In certain embodiments, the concentration of the one or more soluble organic compounds in the first layer independently varies from about 0.1 g/L to about 25 g/L.

In certain embodiments, the one or more sulfide sources are at least one selected from the group consisting of $Na_2S$, $K_2S$ and FeS.

In certain embodiments, the concentration of the one or more sulfide sources in the second layer independently varies from about 100 nM to about 100 mM.

In certain embodiments, after contacting the first and second layers, an oxygen gas concentration gradient is formed within the first and second layers, wherein the oxygen gas concentration is higher in the first layer as compared to the second layer.

In certain embodiments, after contacting the first and second layers, a sulfide ion concentration gradient is formed within the first and second layers, wherein the sulfide ion concentration is higher in the second layer as compared to the first layer.

In certain embodiments, the method does not comprise at least one step selected from the group consisting of sulfur melt incorporation and sulfur impregnation.

In certain embodiments, the first and second layers are contacted at a temperature ranging from about 2° C. to about 40° C. In other embodiments, the first and second layers are contacted at room temperature.

In certain embodiments, at least one property selected from the group consisting of composite rigidity, extent of carbon/sulfur network formation in the composite and sulfur loading in the composite is controlled by varying the concentration and/or identity of the one or more soluble organic compounds and the one or more sulfide sources in the layers.

In certain embodiments, the composite is flexible or rigid. In other embodiments, the composite comprises one or more structural features selected from the group consisting of tubes, filaments, spheres and platelets. In yet other embodiments, at least one filament has a thickness ranging from about 10 nm to about 10 μm. In yet other embodiments, at least one filament has a length ranging from about 1 μm to about 500 μm.

In certain embodiments, at least one filament is rectilinear. In other embodiments, at least one filament is twisted. In yet other embodiments, at least one filament is branched. In yet other embodiments, at least one filament is not branched. In yet other embodiments, at least one filament is branched at an about 45° angle to about 90° angle.

In certain embodiments, the gel in the second phase comprises agar.

In certain embodiments, the pH of the first layer is between about pH 6 and about pH 10. In other embodiments, the pH of the second layer is between about pH 6 and about pH 10. In yet other embodiments, the pH of the second layer is about 7.5 at the time of contacting the first and second layers.

In certain embodiments, the composite comprises a tube in at least one form selected from the group consisting of helical, isolated, bundled, and arranged in perpendicular lattices. In other embodiments, the composite comprises a sulfur-carbon sphere (SCS).

In certain embodiments, the composite comprises elemental sulfur ($S^0$). In other embodiments, the elemental sulfur is in a form selected from the group consisting of amorphous sulfur, alpha-cyclooctasulfur ($\alpha$-$S_8$), and beta-cyclooctasulfur ($\beta$-$S_8$).

In certain embodiments, the composite comprises an organic outer shell comprising one or more selected from the group consisting of carboxylic group, aromatic group, aliphatic group, amine group and ketone.

The invention further provides a carbon/sulfur composite, wherein the composite comprises multidimensional carbon tubular and/or spherical networks loaded with elemental sulfur ($S^0$).

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIG. 1A is an exemplary photograph of a gradient tube synthesis method showing the first (top) layer with the dissolved organics and aqueous salt solution in contact with the atmosphere laid on top of the second, anoxic layer with sulfide (bottom "plug"), forming a film of C/S composite materials within the first top layer.

FIG. 1B is an exemplary graph outlining exemplary total sulfide ($S^{2-}$tot) and oxygen ($O_2$) profiles in the top layer of a tube after one day of contact. Total sulfide concentrations were calculated using measured $H_2S$ and pH profiles.

FIG. 2B depicts bundling flexible filaments formed in the presence of yeast extract 2 g/L. FIG. 2C depicts rigid filaments forming a perpendicular 2D lattice, formed in the presence of yeast extract 5 g/L and peptone 5 g/L. FIG. 2D depicts rigid branching filaments formed in the presence of yeast extract 2 g/L and peptone 10 g/L.

FIG. 3A shows rounded mineral sulfur grains with irregular shapes formed in the absence of organics. FIG. 3B shows a large view of C/S microstructures formed in the presence of yeast extract 0.125 g/L and peptone 0.625 g/L showing that the filaments form a 2D network. FIG. 3C shows a close up on filaments branching at 45° (dark arrows) and 90° (white arrows) angles. FIG. 3D shows rectilinear filaments and spheres formed in the presence of yeast extract 2 g/L. FIG. 3E shows spheres formed in the presence of yeast extract 0.125 g/L and peptone 0.625 g/L. The fragile shell of the spheres on the right part of the image is broken, showing that these spheres are empty. FIG. 3F shows helical filaments and spheres formed in the presence of yeast extract 2 g/L.

FIG. 4A is a BSE SEM image of filaments and spheres formed in the presence of yeast extract 2 g/L and peptone 10 g/L, showing that the almost transparent C shells are partially filled with sulfur (lighter segments). FIG. 4B is EDXS spectra of the areas circled in FIG. 4A, wherein the top spectrum is for the left circle and the bottom spectrum is for the right circle.

FIGS. 8A-8E are exemplary C K-edge STXM/XANES analyses of C/S microstructures. FIGS. 8A and 8C are images at 288.2 eV, and FIGS. 8B and 8D are organic C maps of C/S microstructures obtained in the presence of yeast extract 2 g/L and peptone 10 g/L (FIGS. 8A-8B) and yeast extract 2 g/L (FIGS. 8C-8D). Arrows in FIGS. 8A-8B point towards a fragment of the agarose film attached to the microstructures. FIG. 8E are CK-edge STXM/XANES spectra of C/S microstructures shown in FIGS. 8A-8D as well as reference spectra for yeast extract, peptone, microbial cells and different microbial extra-cellular structures. Dashed lines indicate energies at 285.0 (1s→π*C=C transitions of unsaturated or aromatic C), 285.2 (1s→π*$_{C=C}$ transitions of unsaturated or aromatic C), 286.8 (1s→π*$_{C=O}$ transitions in ketone or aldehyde functional groups), 287.3 (1s→σ* transitions of aliphatic C), 288.2 (1s→π*$_{C=O}$ transitions in amide groups), 288.6 (1s→π*$_{C=O}$ transitions in carboxylic groups), 289.3 (1s→3p/σ* transitions in alcohols, ethers or hydroxylated aliphatics) and 290.3 eV (1s→π$_{C=O}$ transitions in carbonate groups). The spectra of the C/S microstructures are similar to those of yeast extract, peptone, *Escherichia coli* cells and *Mariprofundus ferrooxydans* twisted stalks, but differ from the spectra of sheaths and twisted stalks of other environmental Fe-oxidizing bacteria. Scale bars: 5 μm.

FIGS. 9A-9B are illustrative images at 288.2 eV of C/S microstructures obtained in the presence of yeast extract 2 g/L. FIG. 9C is a map of carbon and sulfur obtained on the same areas as FIG. 9B. Scale bar: 5 μm. FIGS. 9D-9E are the individual maps of carbon and sulfur which comprise the composite image depicted in FIG. 9B.

FIGS. 10A-1B=yeast extract 2 g/L; FIG. 10C=yeast extract 2 g/L and peptone 10 g/L; FIG. 10D=glucose 5 g/L; FIG. 10E=casamino acids 5 g/L; FIG. 10F=cellobiose 5 g/L; FIGS. 10G-10H=glycine 5 g/L; FIG. 10I=humic acids 5 g/L. All images were obtained using SEM in the secondary electron mode, except FIG. 10D which used secondary electron (SE) and backscattered electron (BE) mode.

DETAILED DESCRIPTION OF THE INVENTION

Figure 1C:
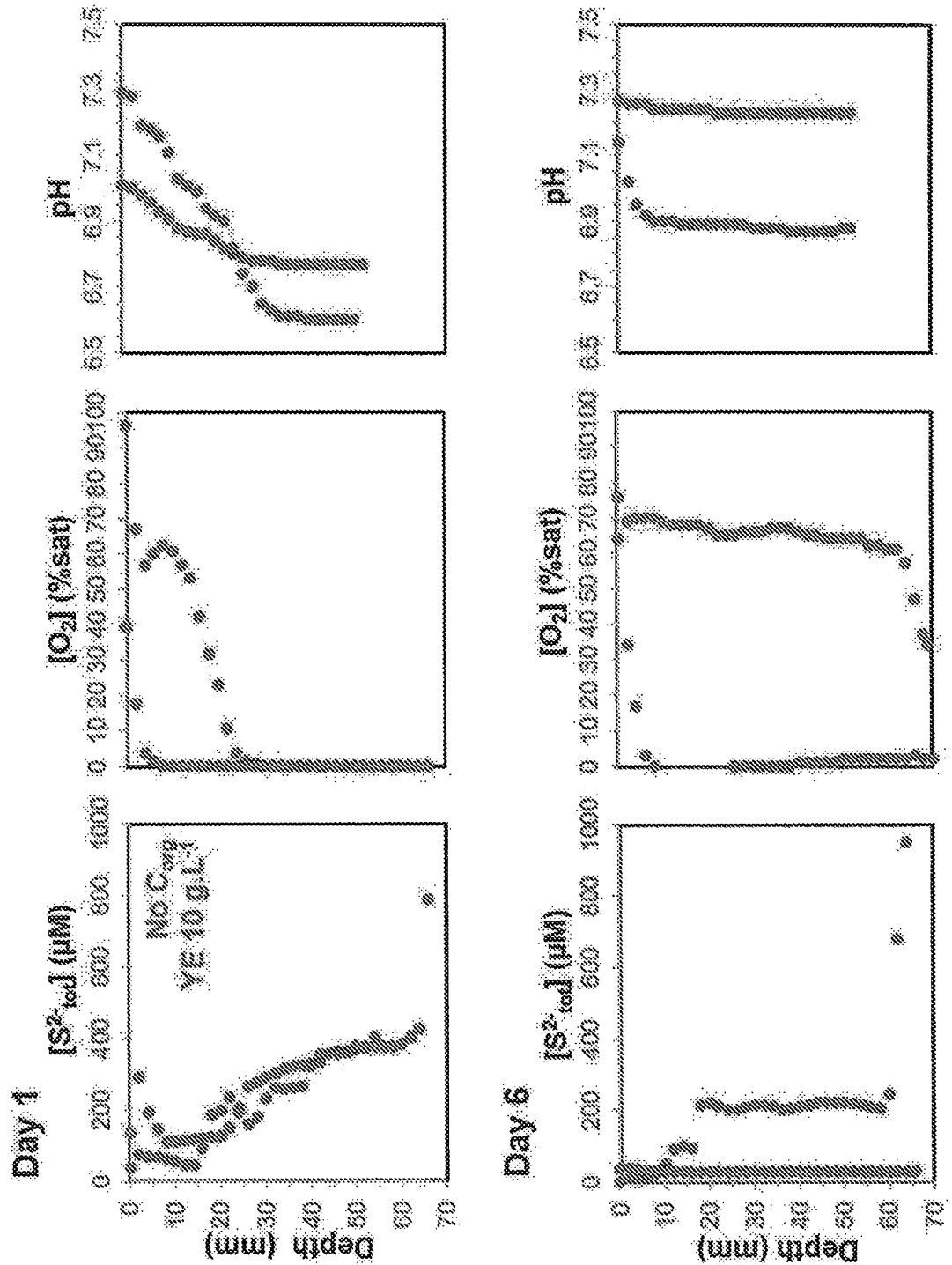
FIG. 1C comprises a series of graphs derived from a gradient tube synthesis experiment outlining exemplary total sulfide ($S^{2-}$tot), oxygen ($O_2$) profiles and pH profiles in the first layer of a tube after one day and six days of contact. Total sulfide concentrations were calculated using measured $H_2S$ and pH profiles

The invention relates to the unexpected discovery of novel methods of preparing tube and/or sphere composites that are co-formed of carbon and elemental sulfur. In certain embodiments, the sulfur is present at high loadings in the composites of the invention. In certain embodiments, the sulfur is present as an amorphous or crystalline form, such as a-, b-S(0). The composites of the invention may vary in dimension by up to three orders of magnitude. In certain embodiments, the composites of the invention have high energy storage capacity, conductivity and/or stability compatible with advanced C/S composite cathodes in batteries.

Definitions

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in cell culture, molecular genetics, organic chemistry, and peptide chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, from the specified value, as such variations are appropriate to perform the disclosed methods.

As used herein, the term "instructional material" includes a publication, a recording, a diagram, or any other medium of expression that may be used to communicate the usefulness of the compositions of the invention. In one embodiment, the instructional material may be part of a kit useful for generating a polymer system of the invention. The instructional material of the kit may, for example, be affixed to a container that contains the compositions of the invention or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

As used herein, the term "microparticle" is a particle with a diameter ranging from about 1 micrometer to 100 micrometers. As used herein, term "microparticle" can also describe particle structures with dimensions ranging up 1,000 μm. In certain embodiments, microparticles often possess physical properties distinct from the properties of the bulk material.

As used herein, the term "microsphere" is a microparticle that is spherical in shape. In certain embodiments, the microspheres are carbon microspheres.

As used herein, the term "microtube" is a microparticle that is cylindrical in shape. In certain embodiments, microtubes can be hollow microtubes. In other embodiments, the microtubes comprise a carbon microtube outer "shell" that is filled with a second material.

As used herein, the term "nanoparticle" is a particle with a diameter ranging from about 1 nanometer to 100 nanometers. As used herein, term "nanoparticle" can also describe particle structures with dimensions ranging up 1,000 nm. In certain embodiments, nanoparticles often possess physical properties distinct from the properties of the bulk material.

As used herein, the term "nanosphere" is a nanoparticle that is spherical in shape. In certain embodiments, the nanospheres are carbon nanospheres.

As used herein, the term "nanotube" is a nanoparticle that is cylindrical in shape. In certain embodiments, nanotubes can be hollow nanotubes. In other embodiments, the nanotubes comprise a carbon nanotube outer "shell" that is filled with a second material.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein:
BSE Backscattered electron
C/S Carbon/Sulfur
EDXS Energy-Dispersive X-ray Spectroscopy
SCMS sulfur carbon microspheres
SCMT sulfur carbon microtubes
SCNS sulfur carbon nanospheres
SCNT sulfur carbon nanotubes
SEM Scanning Electron Microscopy
STXM Scanning Transmission X-ray Microscopy
XANES X-ray Absorption Near Edge Structure
YEP yeast-extract and/or peptone mixtures
Methods The invention provides methods of synthesizing C/S composites of the invention, which in certain embodiments comprise multidimensional tubular and spherical particles or networks of carbon loaded with elemental sulfur. In certain embodiments, the methods comprise reacting one or more dissolved organic compounds in presence of sulfide and oxygen in an aqueous mineral solution.

In certain embodiments, the composites of the invention are synthesized in opposing gradients established between sulfide and oxygen, comprising two layers in a glass or plastic tube, petri-dish and/or tray. The first layer comprises a salt solution containing varying concentrations of one or more organic compounds, depending on the desired morphology and size of the composites. The second layer comprises a gel comprising agar (at a concentration of, for example, 1% w/v), a salt solution and a sulfide source (such as, but not limited to, sodium, potassium and/or ferrous sulfide, at a concentration of about 100 nM to about 100 mM). In certain embodiments, the first salt solution comprising dissolved organics can be directly mixed together with a second solution comprising dissolved sulfide, and this first solution may comprise any salt component that is compatible with the other components comprised in the first and/or second solutions. In other embodiments, either or both of the salt solutions may be EM Medium [which comprises NaCl (2.75-27.5 g/L), $MgCl_2$ (5.38 g/L), KCl (0.72 g/L), $NaHCO_3$ (0.2 g/L), $CaCl_2$ (1.4 g/L), $NH_4Cl$ (1 g/L), optionally $K_2HPO_4$ (0.05 g/L)], and/or Wolfe's mineral medium [Dworkin et al., Ed. *The prokaryotes. A handbook on the biology of bacteria*. Vol. 5: Proteobacteria: alpha and beta subclasses. 3 ed. Berlin: Spinger; 2006; Nitrilotriacetic acid (1.5 g), $MgSO_4.7H_2O$ (3.0 g), $MnSO_4.H_2O$ (0.5 g), NaCl (1.0 g), $FeSO_4.7H_2O$ (0.1 g), $Co(NO_3)_2.6H_2O$ (0.1 g), $CaCl_2$ (0.1 g), $ZnSO_4.7H_2O$ (0.1 g), $CuSO_4.5H_2O$ (0.01 g), $AlK(SO_4)_2.12H_2O$ (0.01 g), $H_3BO_3$ (0.01 g), $Na_2MoO_4.2H_2O$ (0.01 g), $Na_2SeO_3$ (anhydrous) (0.001 g), $Na_2WO_4.2H_2O$ (0.01 g), $NiCl_2.6H_2O$ (0.02 g), distilled $H_2O$ (1.0 L)], optionally amended with 1 mL trace element mix for 1,000 mL (1 mL/L): 0.52 g EDTA, 0.15 g $FeCl_2.4H_2O$, 7 mg $ZnCl_2$, 10 mg $MnCl_2.4H_2O$, 6.3 mg $H_3BO_3$, 19 mg $CoCl_2.6H_2O$, 1.7 mg $CuCl_2.2H_2O$, 24 mg $NiCl_2.6H_2O$, 36 mg $Na_2MoO_4.2H_2O$, and optionally amended with vitamins.

In certain embodiments, the one or more organic compounds can be selected from the group consisting of yeast extract, peptone, humic acids, amino acids, sugars or equivalent soluble carbon-containing organic compounds. In other embodiments, the one or more organic compounds can be selected from the group consisting of casamino acids, glucose, cellobiose and glycine. In other embodiments, the organic compounds can be dissolved in the reaction mixture at a concentration independently ranging from about 0.1 g/L to about 25 g/L.

The top layer of the gradient tube, plate or tray may be purged of oxygen gas, for example by bubbling an inert gas (such as nitrogen gas, carbon dioxide, argon, and any mixtures thereof) through the layer. In certain embodiments, the first layer is purged of oxygen gas before it is contacted with the second layer. In other embodiments, the first layer is not purged of oxygen gas before it is contacted with the second layer. In other embodiments, the second layer is free of, or essentially free of, dissolved oxygen gas at the time of contacting the two layers. In yet other embodiments, after the contacting of the first layer and the second layer, oxygen gas diffuses into the first layer, forming an oxygen gas gradient wherein the oxygen gas concentration is higher in the first layer and decreases towards the second layer. In yet other embodiments, after the contacting of the first layer and the second layer, sulfide ions diffuse into the first layer, forming a sulfide ion gradient wherein the sulfide ion concentration is higher in the second layer and decreases towards the first layer.

In certain embodiments, the reactions can be performed at room temperature (RT). In other embodiments, the reactions can be performed at a temperature from about 2° C. to about 40° C.

In certain embodiments, the pH of the first layer and the second layer can be independently from pH 6 to about pH 10. In other embodiments, the pH of the second layer is adjusted to about 7.5 using an appropriate acid, such as, but not limited to, HCl.

The formation of the composites of the invention may occur at room temperature within a period of time ranging from instantly to 1 day, 2 days, 3 days, 4 days, 5 days, 6 days, 7 days, 8 days, 9 days, 10 days, 2 weeks, 1 month, 2 months, 3 months, 4 months or more.

In certain embodiments, the morphology, size and abundance of the composites of the invention can be controlled by independently adjusting the concentration of the one or more soluble organic compounds present in the first layer of the sulfide gradient tubes. Composites with thicknesses varying from 10 nm to 100 μm can be obtained. The length of the composites of the invention can vary from about 10 μm to about 500 μm. Other parameters that can be controlled are the rigidity of the composites (in certain embodiments, the more rigid structures are the more loaded with elemental sulfur), as well as the presence or absence of branching. Branching usually occurs at about 45° and 90°. Helical SCT are also observed, along with organizational arrangements comprising isolated tubes, bundles, and tubes forming perpendicular lattices. Further, sulfur-carbon spheres (SCS), with diameters varying from about 0.5 to about 1.5 μm, may co-occur with SCT in the sulfide gradient tubes.

The rigidity, extent of C/S network formation, and sulfur loadings can be controlled by varying the amounts and composition of the dissolved organic compound and activity of dissolved sulfide.

In certain embodiments, the composites of the invention are hollow carbon-rich tubes, filaments (branching or not branching, rectilinear or twisted), spheres, platelets or any combination of thereof. In certain embodiments, the composites are at least partially filled with sulfur. In certain embodiments, the composites of the invention comprise zero-valent sulfur ($S^0$). In other embodiments, the composites comprise carbon associated with elemental sulfur in one or more forms selected from the group comprising amorphous sulfur, alpha-cyclooctasulfur ($\alpha$-$S_8$), or beta-cyclooctasulfur ($\beta$-$S_8$) In certain embodiments, the carbon-rich phase is a complex mixture of different types of organic molecules (including carboxylic groups, aromatic groups, aliphatic groups, ketones and amide functional groups), as shown by STXM at the C K-edge.

The composites of the invention can be used as starting materials for the design of electrodes, such as cathodes optimized for Li—S batteries. In certain embodiments, the composites of the invention comprise a multi-dimensional network of a carbon that can host high loadings of sulfur, where thermal incorporation of sulfur into the carbon lattice and annealing is not required. The size of the networks and the loadings of sulfur can be controlled, which can be used to buffer volume changes during cycling of a Li—S battery, while the energy storage capacity and conductivity can be simultaneously optimized. The methods of the invention allow for synthesis of carbon spheres with a high sulfur stability.

In certain embodiments, the synthetic methods of the invention can be conducted at room temperature in a one-step method. In such cases, the methods of the invention do not require first synthesizing the organic compound, and then implementing sulfur melt incorporation or impregnation to create a C/S composite. Instead, elemental sulfur/carbon tubes and/or spheres are co-formed during the reaction of sulfide with the soluble organic compounds, and thus are intimately associated. In certain embodiments, the composites of the invention have morphologies that range in scale from <40 nm to micron scale widths, and up to hundreds of microns in length. In other embodiments, the composites are flexible fibers or rigid structures that branch at an about 45° to about 90° angle.

As described herein, the invention provides novel one-pot methods of synthesizing carbon-sulfur composites, which in certain embodiments are analogous to carbon-sulfur microtubes (SCMT) and microspheres (SCMNS), and carbon-sulfur nanotubes (SCNT) and nanospheres (SCNS), of interest for the generation of advanced C/S cathodes in battery applications. The carbon-sulfur composite tubes and/or spheres of the invention may range from nanoscale to microscale.

In certain embodiments, the methods of the invention can be conducted as a direct reaction wherein the sulfide salts and one or more organic compounds are dissolved directly into a single aqueous salt medium and allowed to react over a period of 1 or more days. In certain embodiments, a first solution comprising a salt solution and dissolved organic compounds and a second solution comprising a salt solution and a sulfide salt are prepared anoxically. In other embodiments, the second solution is added to the first solution in a vessel open to an oxygen containing atmosphere and allowed to react.

Compositions

The invention further provides C/S composites that can be synthesized through the methods of the invention.

In certain embodiments, the C/S composites comprise carbon tubes, filaments, spheres and/or platelets. In certain embodiments, the carbon composites have a thickness ranging from about 10 nm to about 10 μm. In certain embodiments, the carbon composites have a length ranging from 1 μm to about 500 μm.

In certain embodiments, at least one carbon filament is branched. In other embodiments, at least one carbon filament is unbranched. In yet other embodiments, at least one carbon filament branches at an about 45° angle to about 90° angle. In yet other embodiments, at least one carbon filament is rectilinear. In yet other embodiments, at least one carbon filament is twisted. In yet other embodiments, the composite comprises a tube in at least one form selected from the group consisting of helical, isolated, bundled, and arranged in perpendicular lattices.

In certain embodiments, the composite comprises an organic outer shell comprising one or more groups selected from carboxylic group, aromatic group, aliphatic group, amine group and ketones.

In certain embodiments, the C/S composites comprise a carbon shell filled with elemental sulfur ($S^0$). In other embodiments, the elemental sulfur is in a form selected from the group consisting of amorphous sulfur, alpha-cyclooctasulfur ($\alpha$-$S_8$), and beta-cyclooctasulfur ($\beta$-$S_8$).

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination.

Although the description herein contains many embodiments, these should not be construed as limiting the scope of the invention but as merely providing illustrations of some of the presently preferred embodiments of the invention.

All references throughout this application (for example, patent documents including issued or granted patents or equivalents; patent application publications; and non-patent literature documents or other source material) are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. In general the terms and phrases used herein have their art-recognized meaning, which can be found by reference to standard texts, journal references and contexts known to those skilled in the art. Any preceding definitions are provided to clarify their specific use in the context of the invention.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

All materials were used without further preparation unless indicated otherwise below.

Materials and Methods

Aqueous Mineral Media

Wolfe's Mineral Medium comprises: Nitrilotriacetic acid (1.5 g), $MgSO_4 \cdot 7H_2O$ (3.0 g), $MnSO_4 \cdot H_2O$ (0.5 g), NaCl (1.0 g), $FeSO_4 \cdot 7H_2O$ (0.1 g), $Co(NO_3)_2 \cdot 6H_2O$ (0.1 g), $CaCl_2$ (0.1 g), $ZnSO_4\ 7H_2O$ (0.1 g), $CuSO_4\ 5H_2O$ (0.01 g), $AlK(SO_4)_2 12H_2O$ (0.01 g), $H_3BO_3$ (0.01 g), $Na_2MoO_4 2H_2O$ (0.01 g), $Na_2SeO_3$ (anhydrous) (0.001 g), $Na_2WO_4 2H_2O$ (0.01 g), $NiCl_2 6H_2O$ (0.02 g), Distilled $H_2O$ (1.0 L).

The "EM" medium comprises:

TABLE 1

EM medium composition

| Compound | Concentration |
|---|---|
| NaCl | 2.75 g/L |
| $MgCl_2$ | 5.38 g/L |
| KCl | 0.72 g/L |
| $NaHCO_3$ | 0.2 g/L |
| $CaCl_2$ | 1.4 g/L |
| $NH_4Cl$ | 1 g/L |
| $K_2HPO_4$ | 0.05 g/L |
| Wolfe's mineral medium | 1 mL/L |
| Trace element mix, for 100 mL: | 1 mL/L |
| 0.52 g EDTA; 0.15 g $FeCl_2 \cdot 4H_2O$; 7 mg $ZnCl_2$; 10 mg $MnCl \cdot 4H_2O$; 6.3 mg $H_3BO_3$; 19 mg $CoCl_2 \cdot 6H_2O$; 1.7 mg $CuCl_2 \cdot 2H_2O$; 24 mg $NiCl_2 \cdot 6H_2O$; 36 mg $Na_2MoO_4 \cdot 2H_2O$ | |

Example 1: Abiogenic Formation of Carbon/Sulfur Microstructures

Carbon/Sulfur microstructures were produced in gradient tubes composed of: (i) an autoclaved agarose plug containing 5 mM of sodium sulfide, and (ii) an autoclaved aqueous top layer composed of EM medium amended with 0.125-10 g/L yeast extract and/or peptone (FIG. 1A). Under these conditions, counter gradients of oxygen and sulfide were rapidly established in the tubes (FIG. 1B-C). After three to six days, filamentous and spherical microstructures could be observed in the tubes where dissolved organics were present (FIGS. 2A-2D, FIGS. 3A-3F). These microstructures were either found suspended in the aqueous top layer, or associated with a whitish agarose film (FIG. 1A), which must be derived from the agar plug at the bottom of the tubes. No filamentous or spherical C/S microstructures were observed in control sulfide gradient tubes where dissolved organics were omitted.

Alternatively, the C/S microstructures were produced in glass bottles containing EM medium and dissolved organics in a single phase in contact with the atmosphere, to which an anaerobically prepared solution of sulfide was added. The sulfide reacted with the dissolved organics to form C/S composites over the course of a few days, similar to the gradient tube method.

Figure 2A:
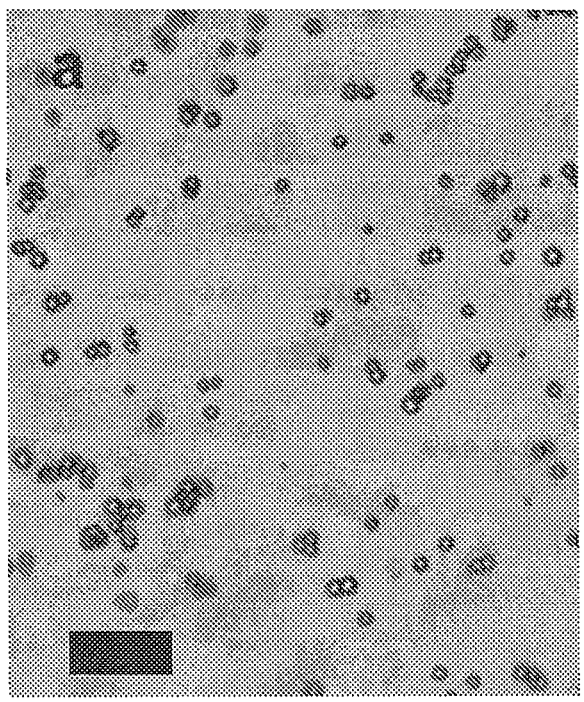
FIG. 2A depicts rounded mineral sulfur grains formed in sulfide gradient tubes the absence of organics.
Figure 2B:
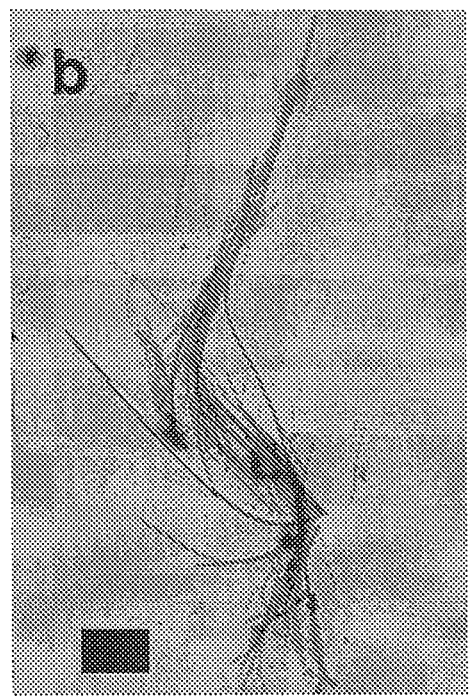
FIGS. 2B-2D are exemplary light microscopy images of C/S composite structures formed in sulfide gradient tubes under variable concentrations of dissolved organics.
Figure 2C:
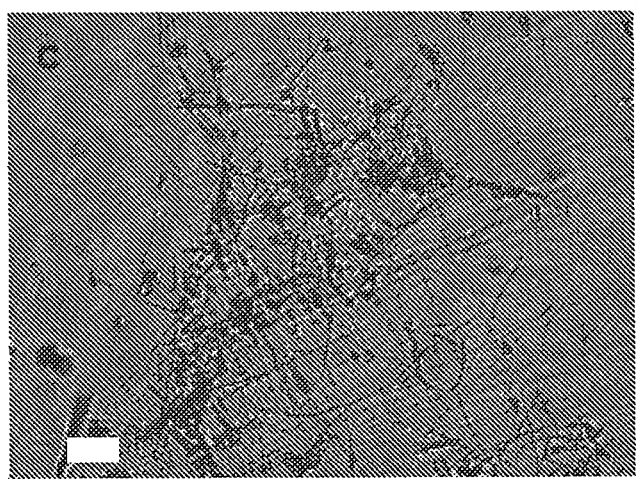
Figure 2D:
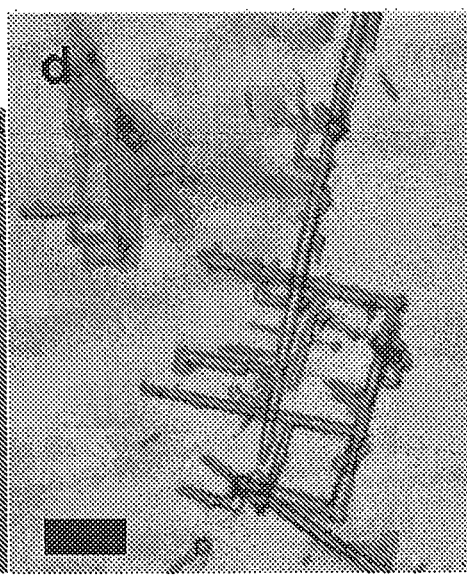
Figure 3A:
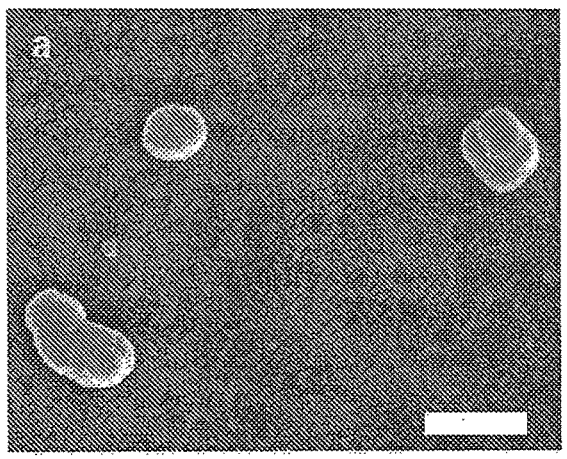
FIGS. 3A-3F depict exemplary SEM images in the SE mode of structures formed in sulfide gradient tubes under variable concentrations of dissolved organics.
Figure 3B:
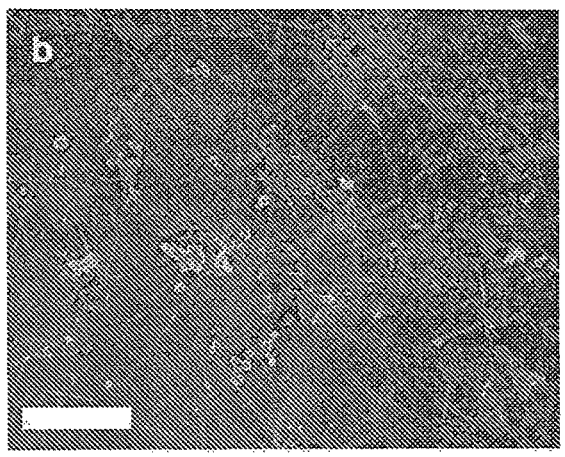
Figure 3C:
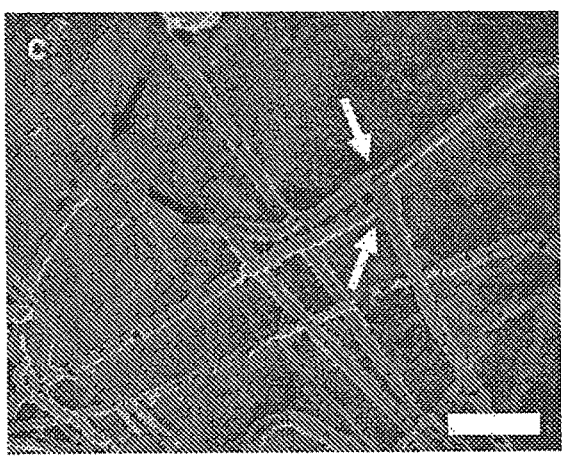
Figure 3D:
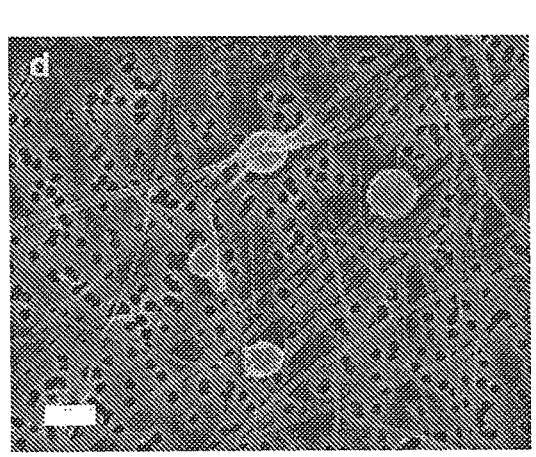
Figure 3E:
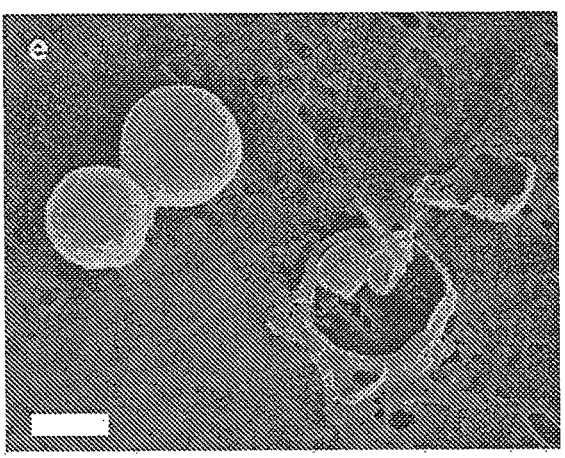
Figure 3F:
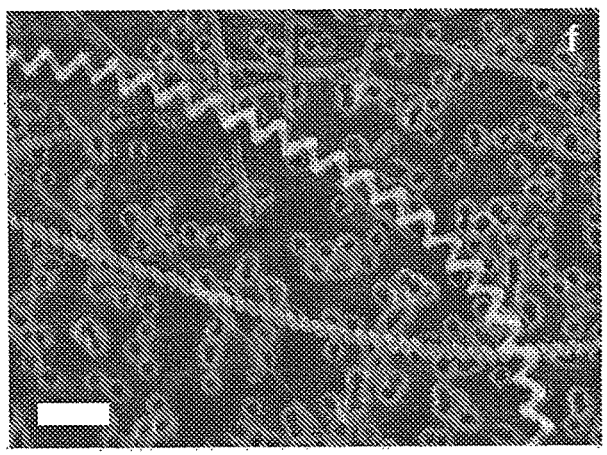

A great diversity of C/S filamentous microstructures with a wide range of sizes, shapes, and spatial organizations could be obtained depending on the concentration of yeast extract and/or peptone present in the top layer of the sulfide gradient tubes (FIGS. 2A-2D, FIGS. 3A-3F). The thicknesses of the filaments ranged from ~40 nm to several micrometers, and the filaments could extend from a few tens of micrometers up to several hundreds of micrometers in length. The size of the structures depended on the type and concentration of dissolved organics present in the gradient tube, where the mean thickness generally increased with an increase in the concentration of yeast extract and/or peptone introduced in the tubes. Filament thicknesses also increased with time during the experiments. The filaments could be either flexible (FIG. 2B) or rigid (FIGS. 2C-2D, FIGS. 3C-3D), branching (FIG. 2D and FIG. 3C) or not branching (FIG. 3D) and were isolated, organized in bundles (FIG. 2B) or connected in perpendicular arrays (FIG. 2C). Branching frequently occurred at 45° and 90° angles (FIGS. 2C-2D, FIG. 3C). Helical filaments were sometimes present in mixture with rectilinear filaments (FIG. 3F). The spherical C/S microstructures were always observed in association with the filaments (as for instance on FIG. 3D). Their diameters did not depend on the composition or concentration of organics and always ranged from 200 to 2000 nm. They were delimited by a fragile shell that sometimes was broken, showing that some of those spheres were empty (FIG. 3E). As mentioned previously, no spherical or filamentous C/S microstructures were found in sulfide gradient tubes prepared without dissolved organics. Under these conditions, small amounts of $S^o$ were instead formed as rounded mineral grains with irregular shapes (FIG. 2A, FIG. 3A). Unlike spherical C/S microstructures, these minerals grains were not surrounded by a shell.

Example 2: Ultrastructure of the C/S Filaments and Spheres

Figure 4A:
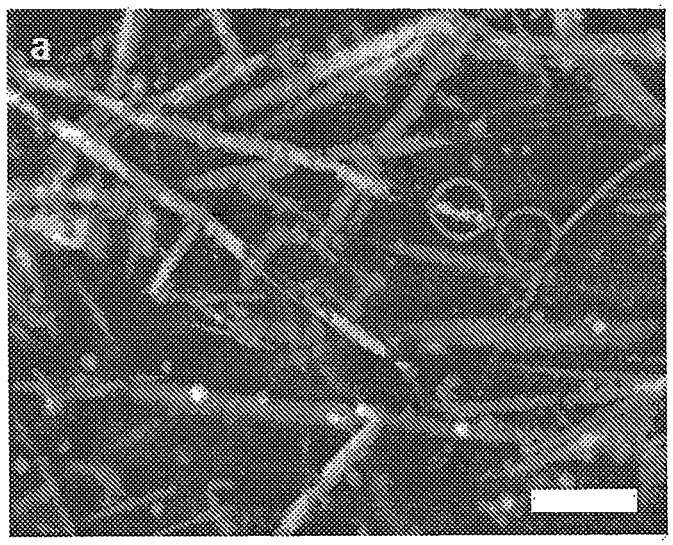
FIGS. 4A-4B are an exemplary SEM image in the BSE mode and EDXS analyses of C/S microstructures.
Figure 4B:
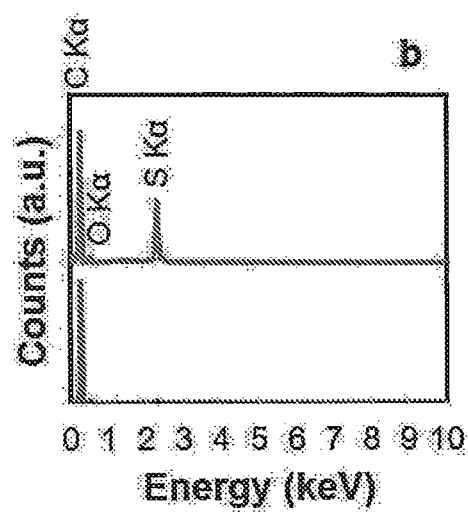
Figure 5:
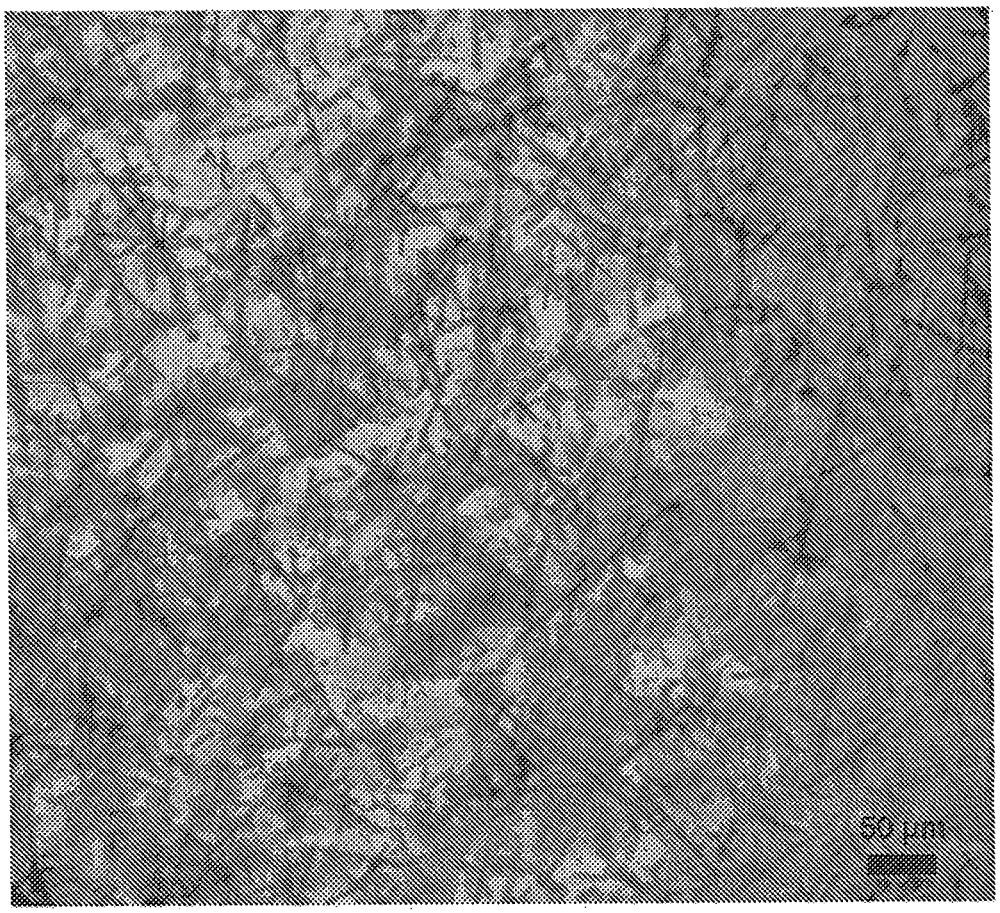
FIG. 5 is an exemplary light microscopy image of structures formed in sulfide gradient tubes with yeast-extract/peptone mixtures from 2-10 g/L.
Figure 6A:
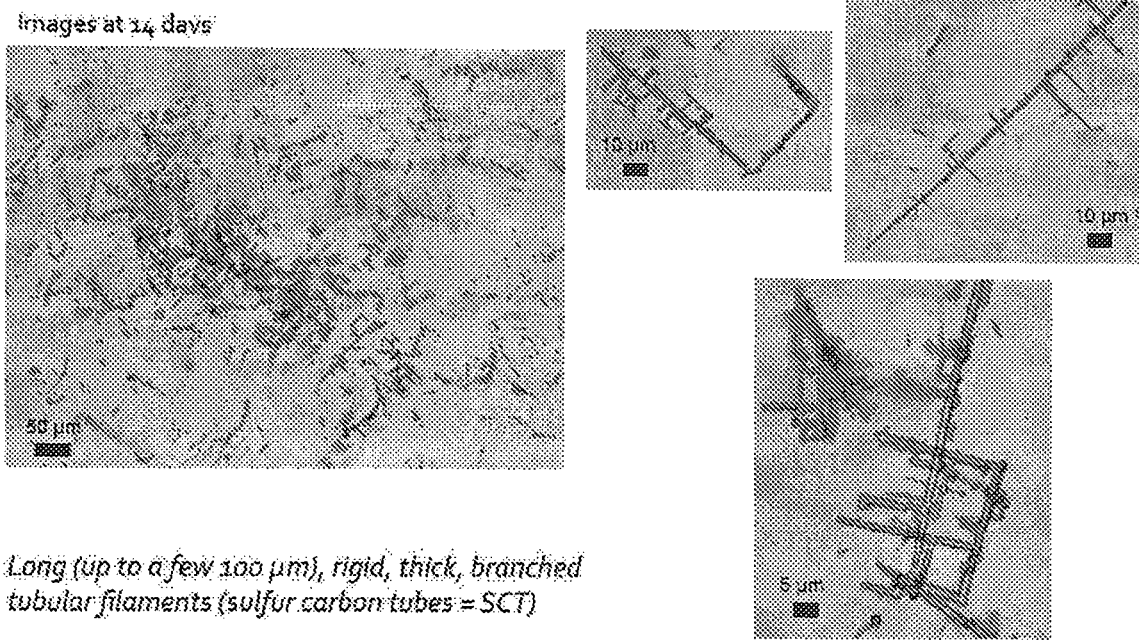
FIGS. 6A-6H are exemplary light microscopy images, coupled with Raman spectra, of the C/S microstructures formed in sulfide gradient tubes with yeast-extract+/−peptone.
Figure 6B:
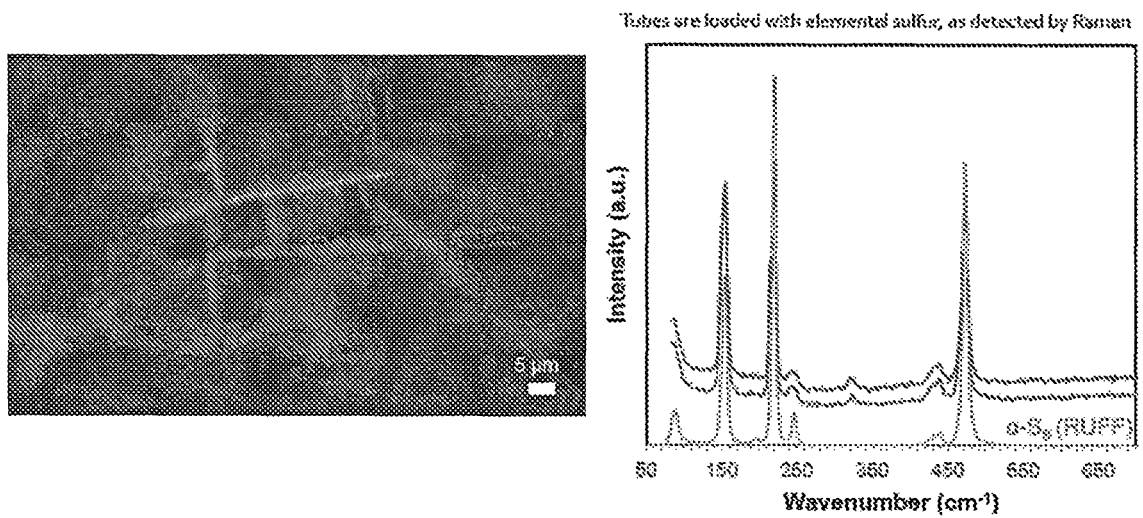
Figure 6C:
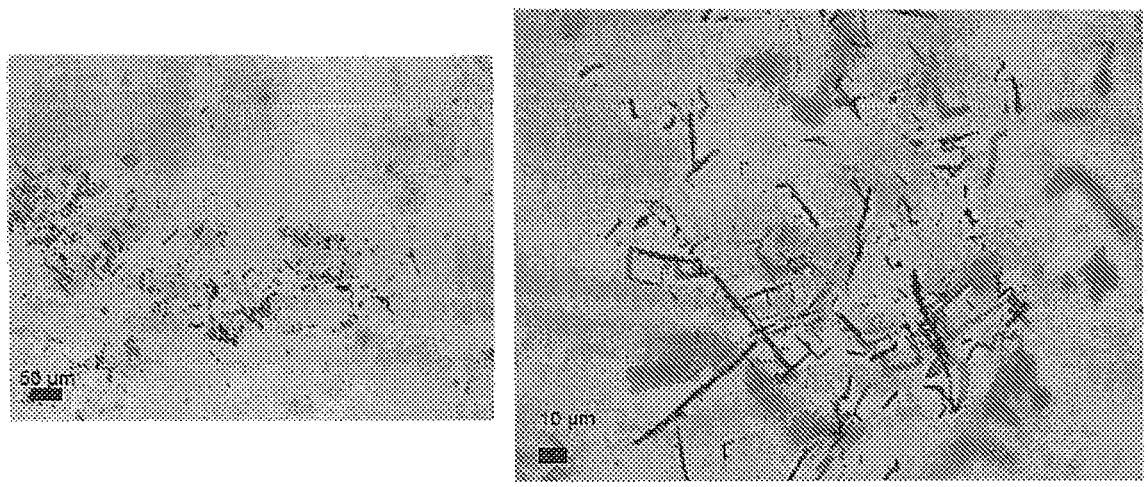
Figure 6D:
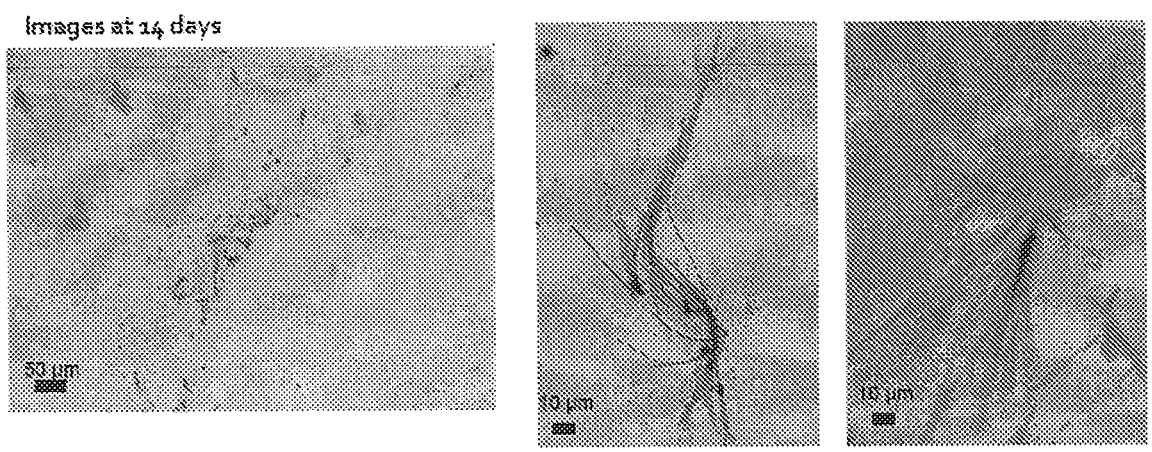
Figure 6E:
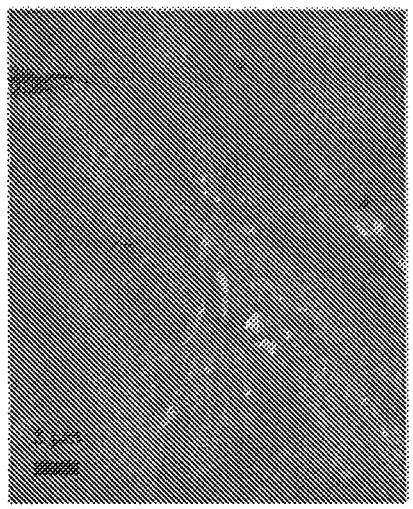
Figure 6E:
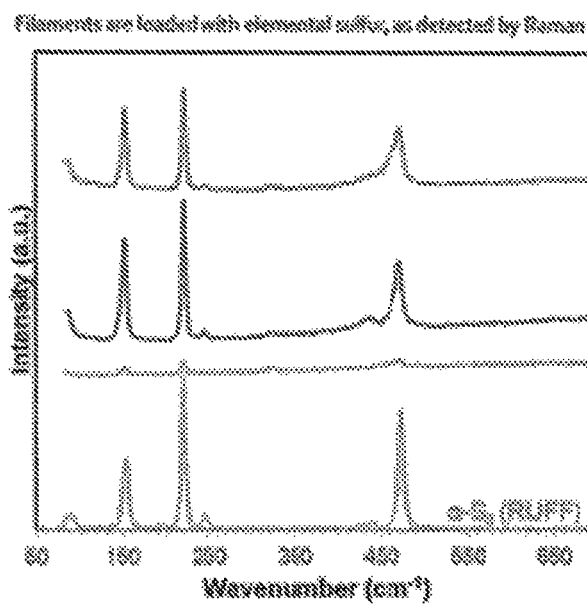
Figure 6F:
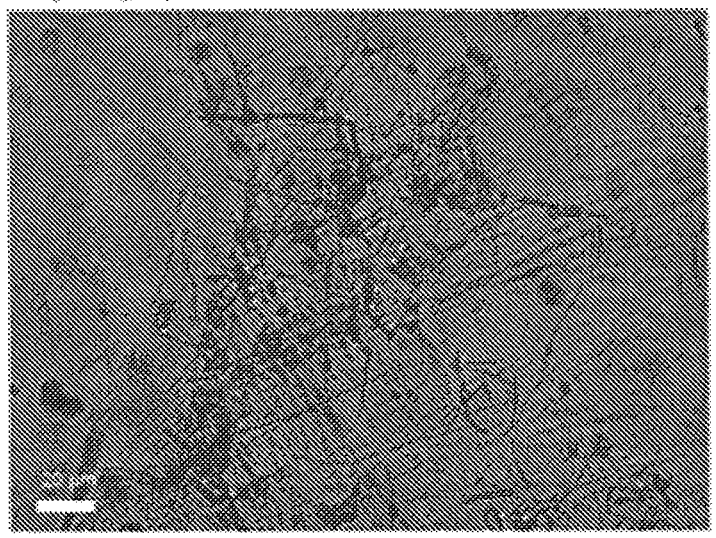
Figure 6F:
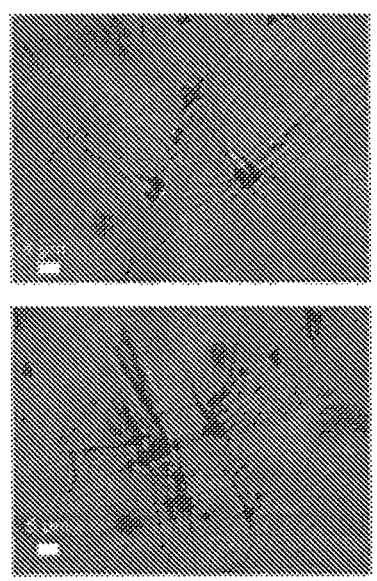
Figure 6G:
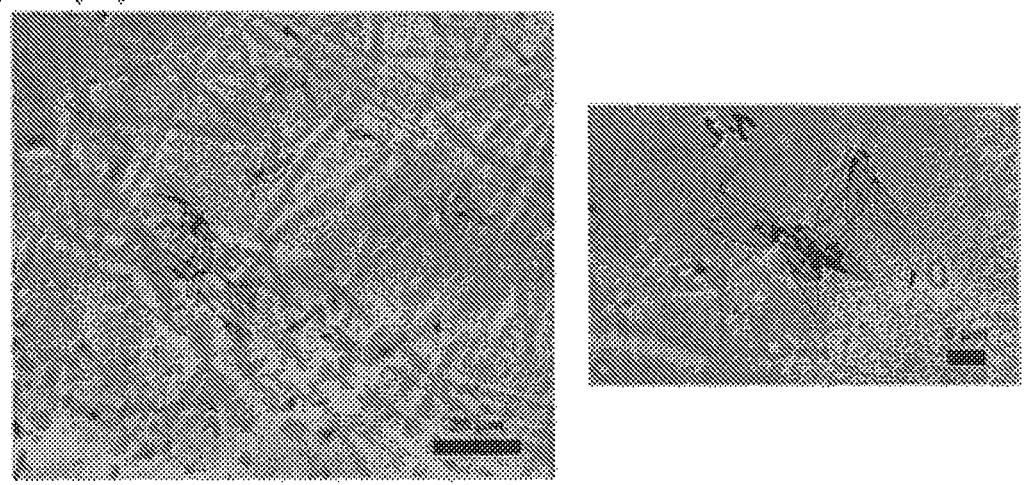
Figure 6H:
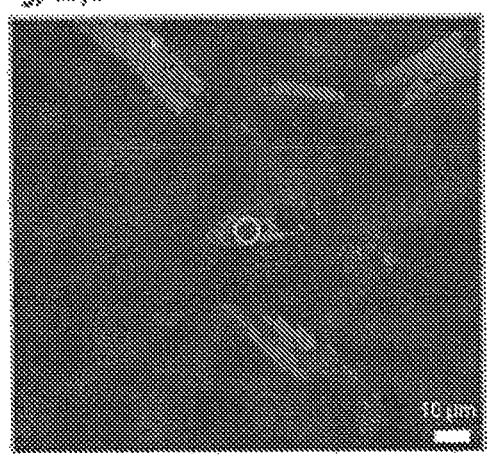
Figure 6H:
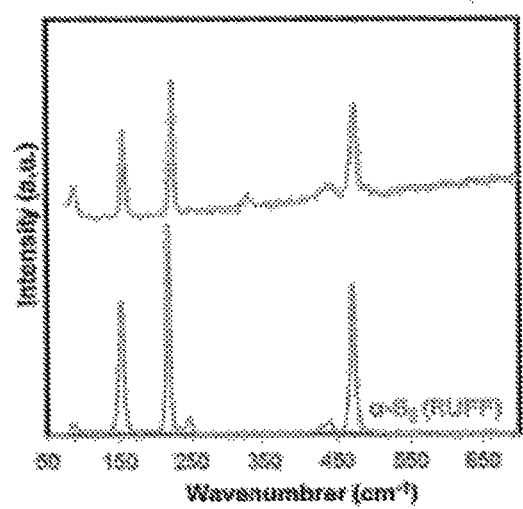
Figure 6I:
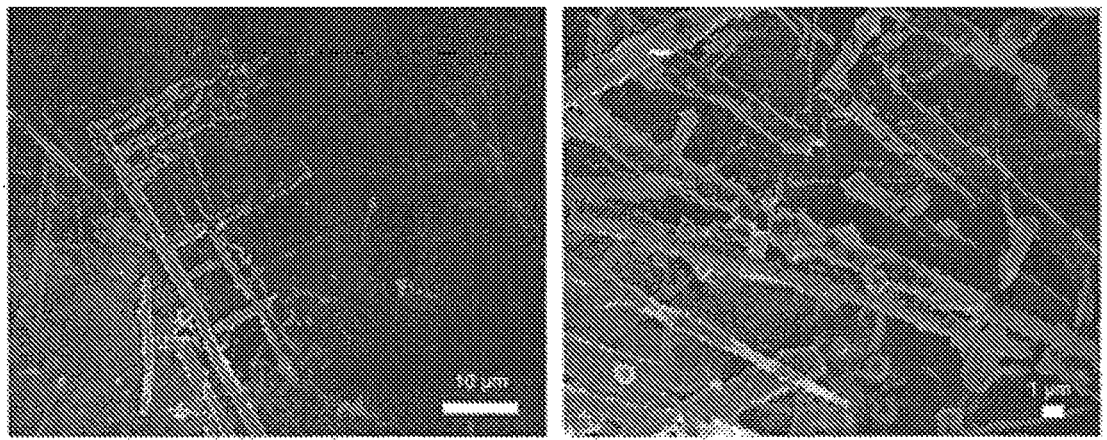
FIGS. 6I-6K are exemplary SEM images of these C/S microstructures with EDXS analyses.
Figure 6J:
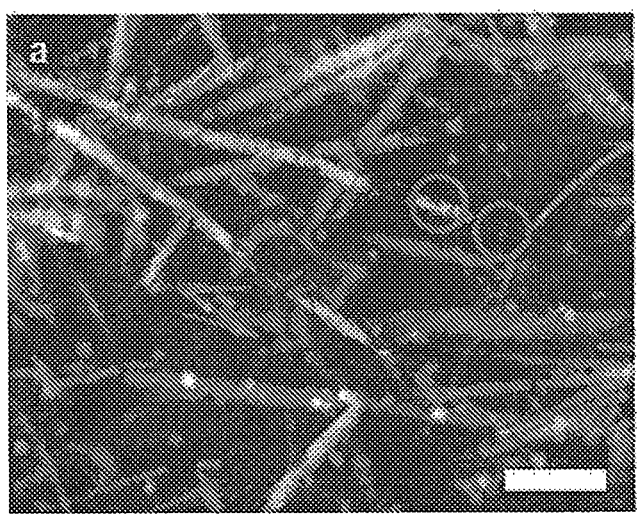
Figure 6J:
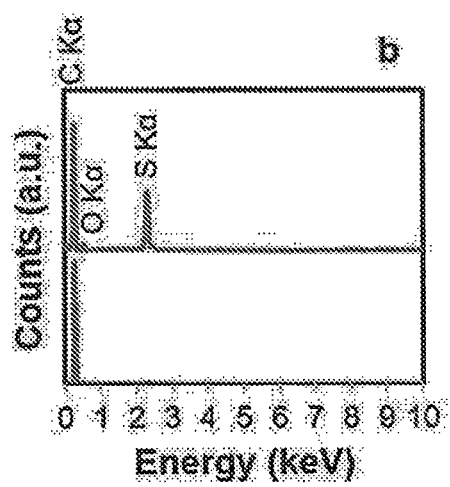
Figure 6K:
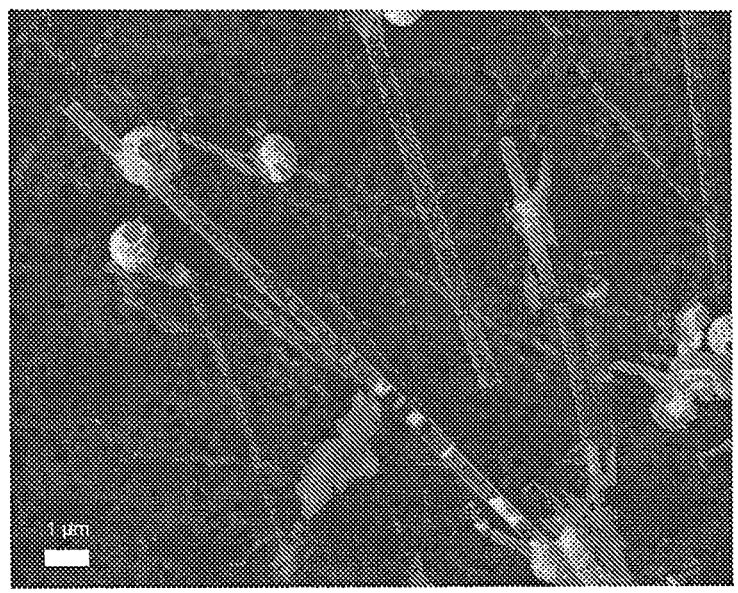
Figure 6L:
FIGS. 6L-6N are exemplary TEM images of these C/S microstructures with electron diffraction analyses.
Figure 6L:
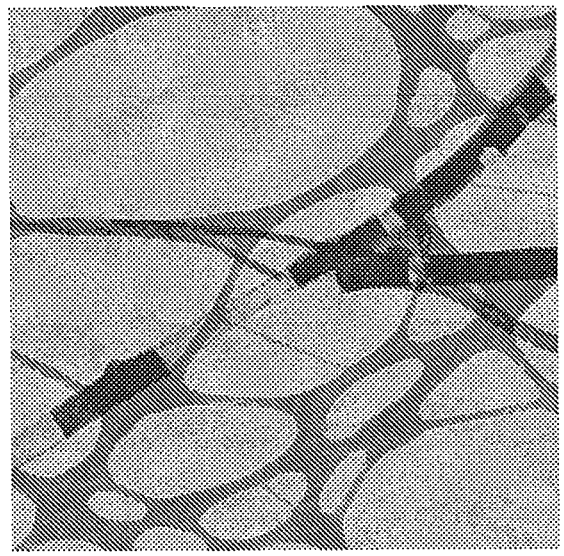
Figure 6M:
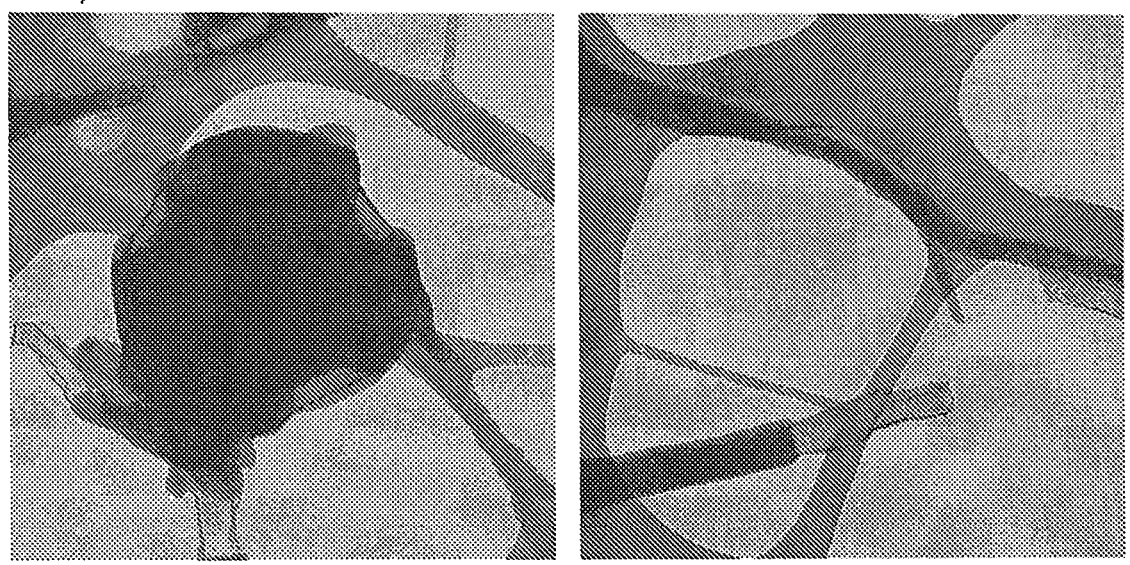
Figure 6N:
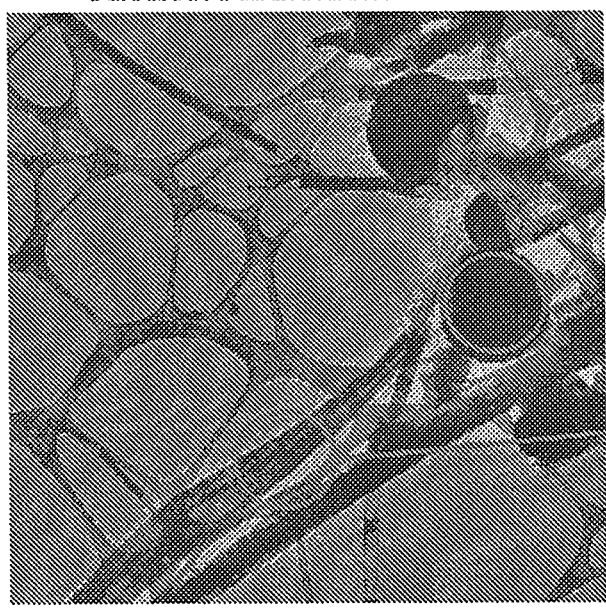
Figure 6N:
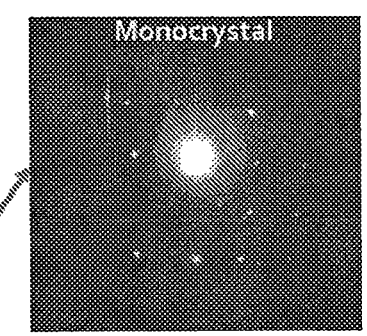
Figure 6N:
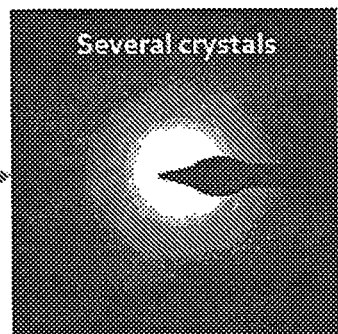

Scanning Electron Microscopy (SEM) imaging in the backscattered electron (BSE) mode coupled with Energy-Dispersive X-ray Spectroscopy (EDXS) provided further insight into the ultrastructure and composition of the C/S microstructures. The filamentous and spherical C/S microstructures are formed by an almost electron-transparent shell mostly composed of carbon (with minor amounts of oxygen). The C shells of the microstructures are then partially filled by a bright phase composed of sulfur (FIGS. 4A-4B). This ultrastructure was resolved at higher resolution by Transmission Electron Microscopy (TEM) imaging, also showing that sulfur, the dark electron dense phase on FIGS. 6L-6M images, partially fills the inside of the tubular or spherical carbon shells of the microstructures.

Example 3: Chemical Speciation of Sulfur and Carbon

Figure 10A:
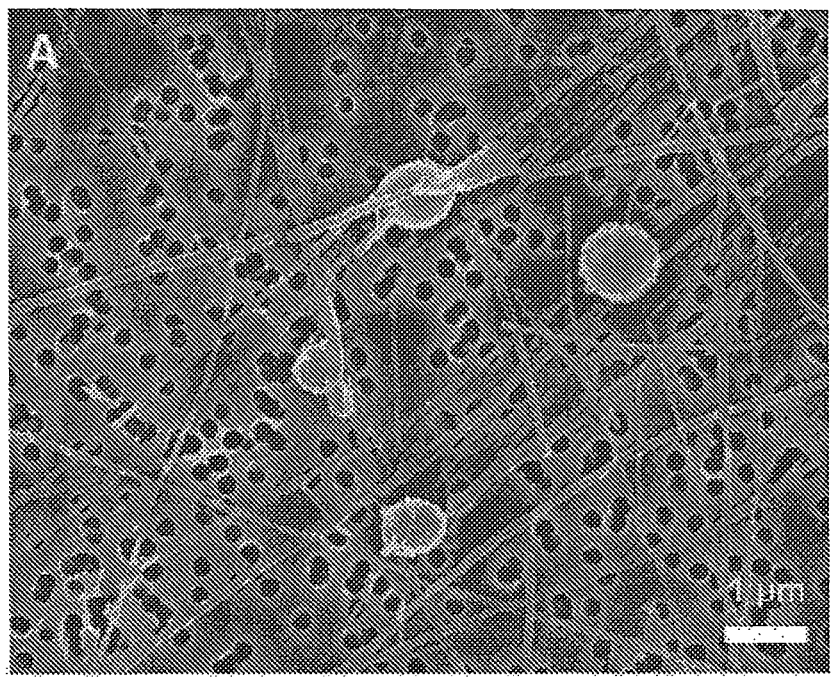
FIGS. 10A-10I are exemplary SEM images demonstrating the morphological diversity of the C/S composites. These C/S composites have been obtained in gradient tubes containing 5 mM Na$_2$S in the bottom layer and diverse concentrations of dissolved organics in the EM medium in the top layer. Dissolved organics and concentrations used were as follows.
Figure 10B:
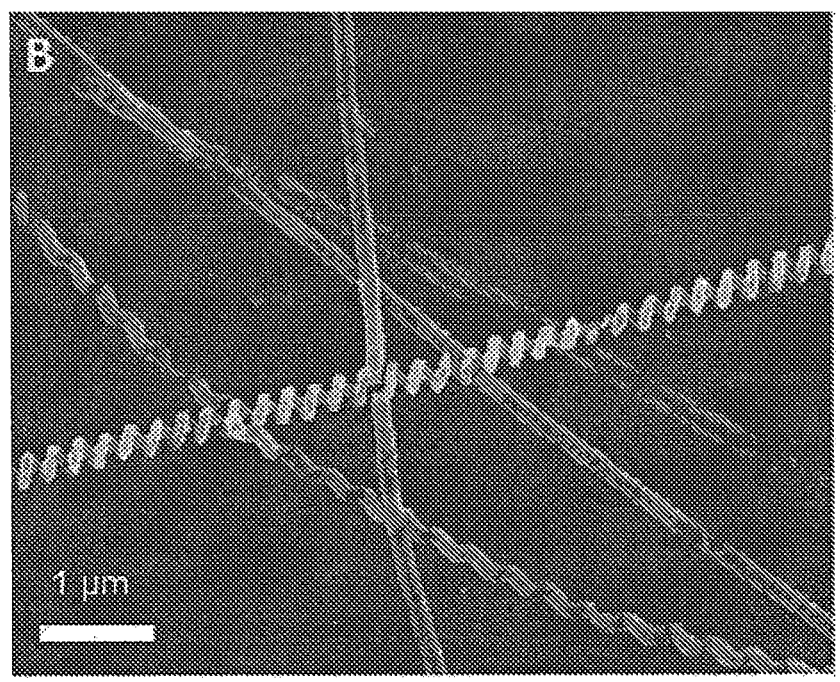
Figure 10C:
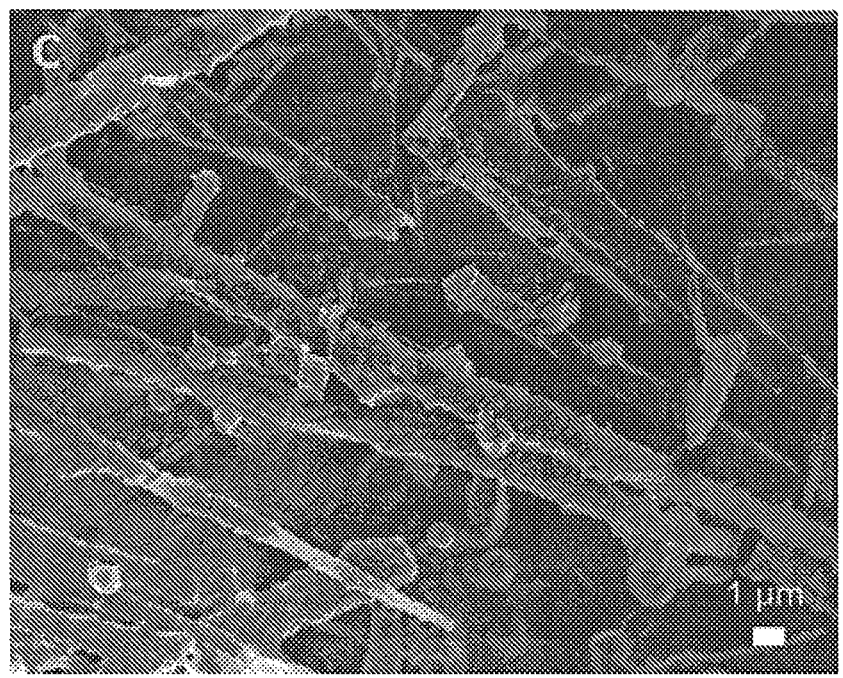
Figure 10D:
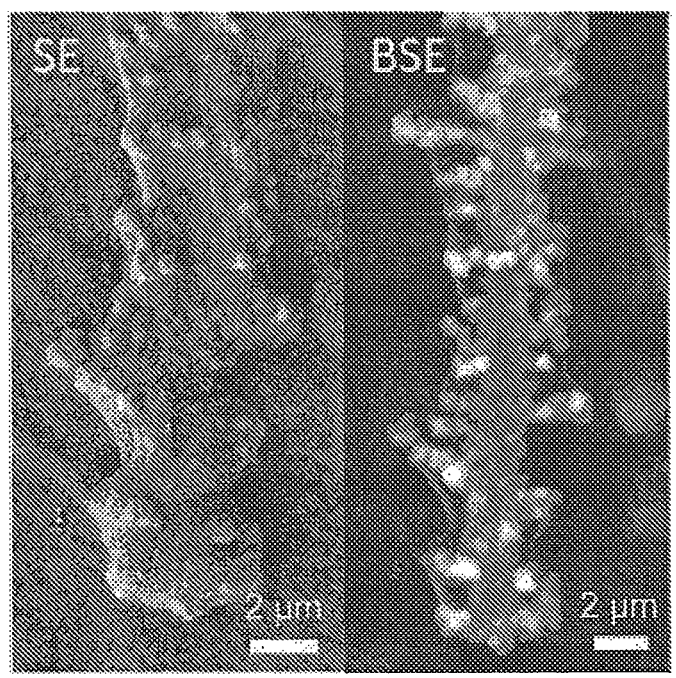
Figure 10E:
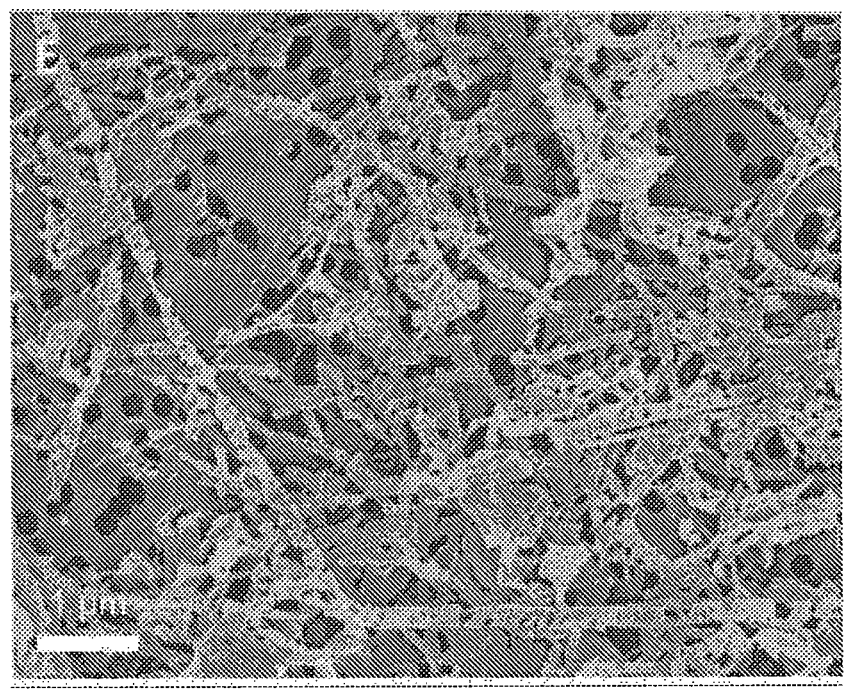
Figure 10F:
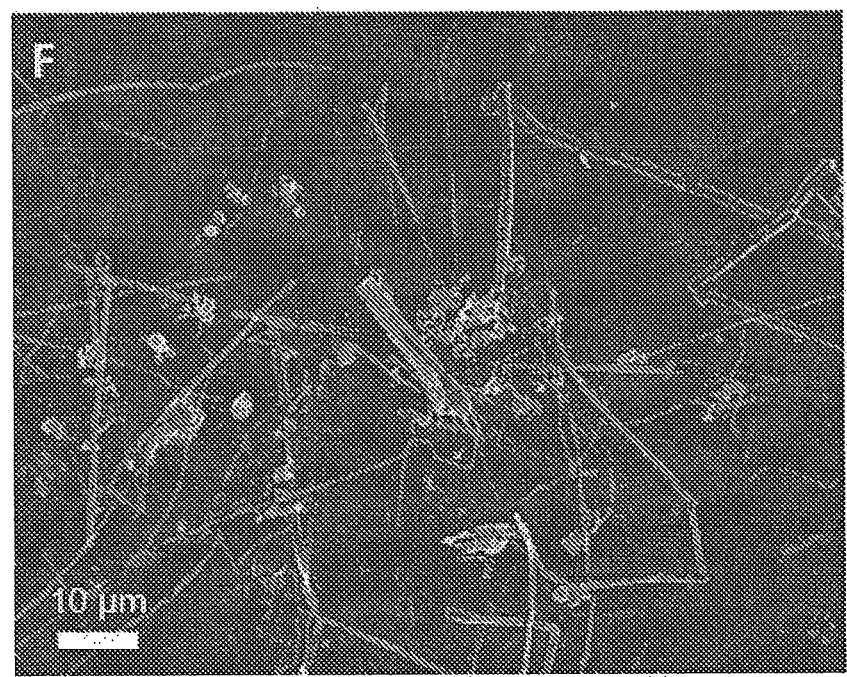
Figure 10G:
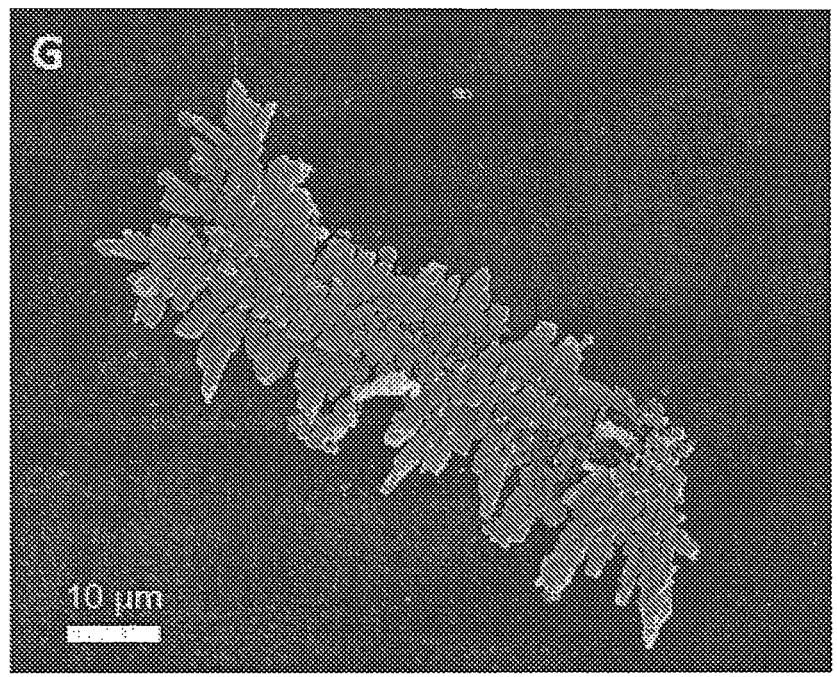
Figure 10H:
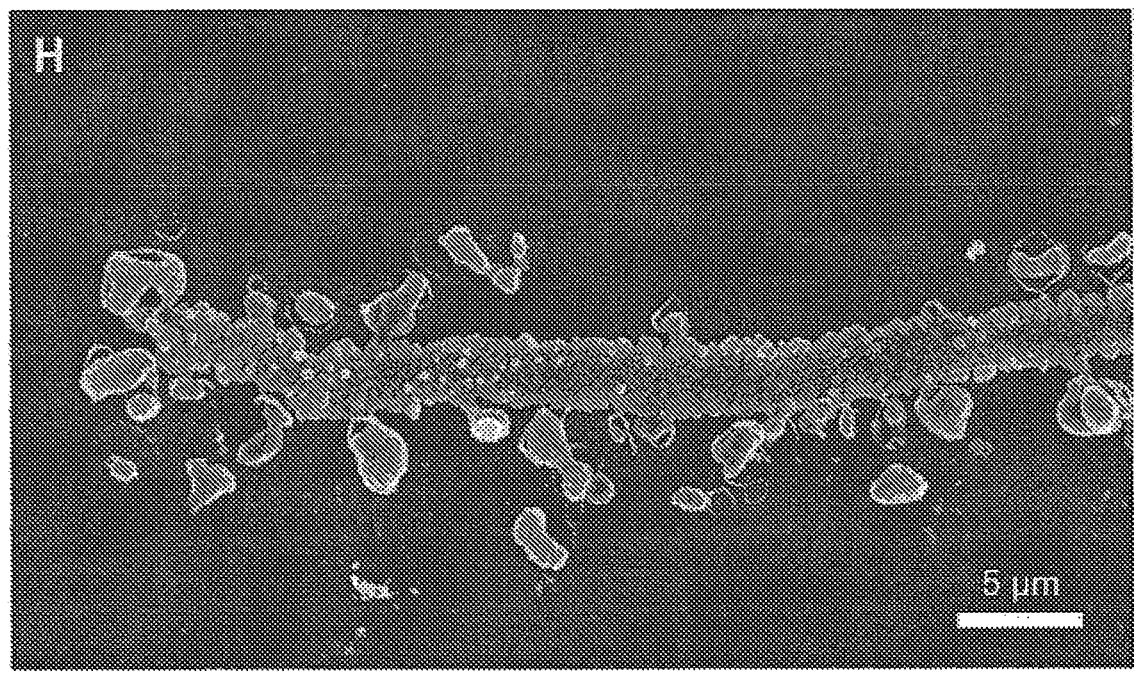
Figure 10I:

Scanning Transmission X-ray Microscopy (STXM) at the C K-edge and S L-edge was used to characterize the distribution and speciation of carbon and sulfur in the C/S microstructures at the submicron scale. STXM maps of C and S confirmed the close association between these two elements in the microstructures (FIGS. 10A-10B).

Figure 7A:
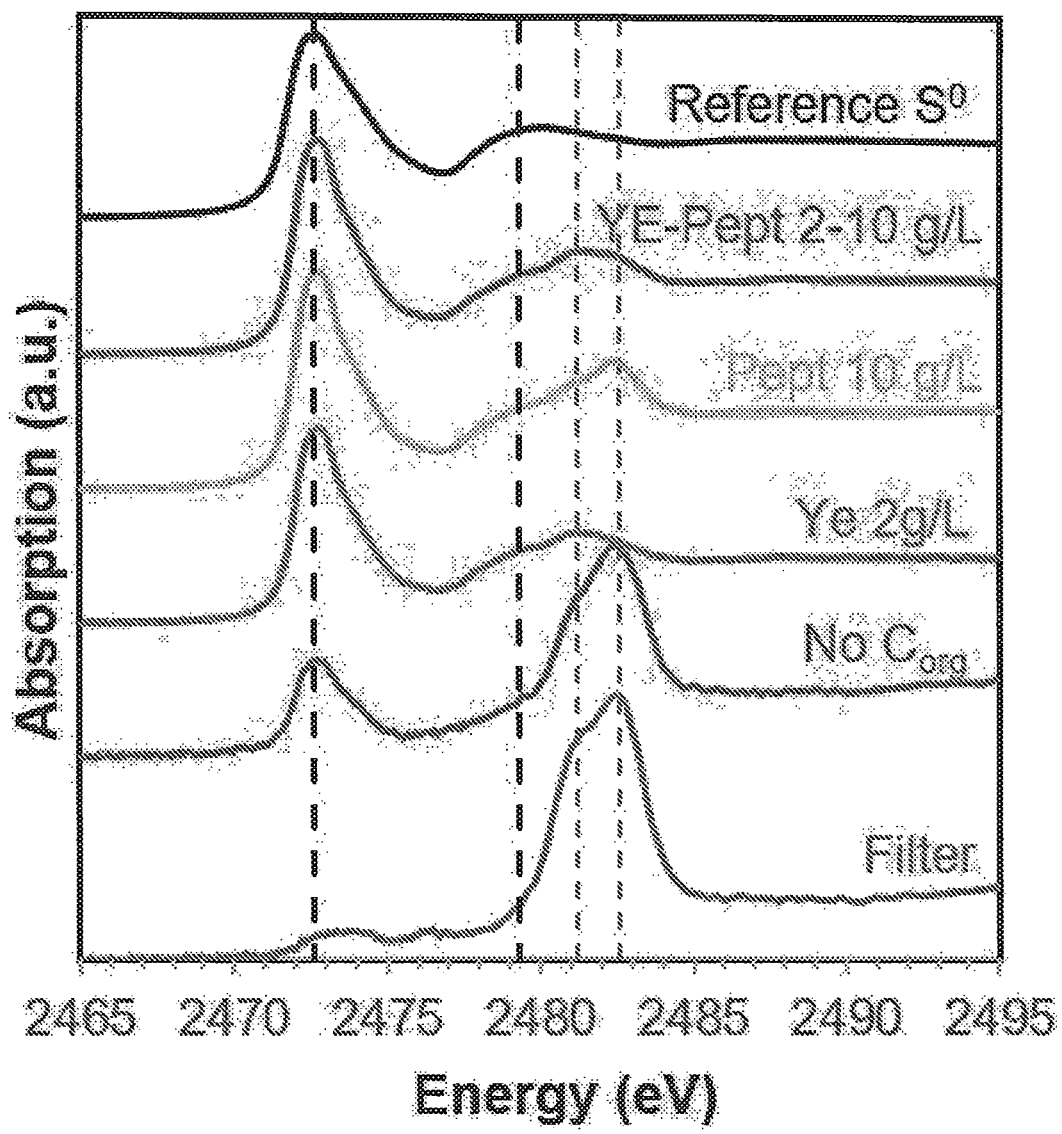
FIG. 7A is an exemplary Bulk S K-edge XANES analyses of C/S microstructures obtained in the presence of different concentrations of yeast extract and/or peptone. The spectra of a reference $S^0$ as well as the polycarbonate filters on which the samples were deposited are also shown. The vertical dashed lines correspond to 2472.6 and 2479.3 eV (main peaks in the reference $S^0$ spectrum), whereas grey vertical dashed lines correspond to 2481.2 and 2482.6 eV (sulfonate and sulfate groups present in the polycarbonate filters).
Figure 7B:
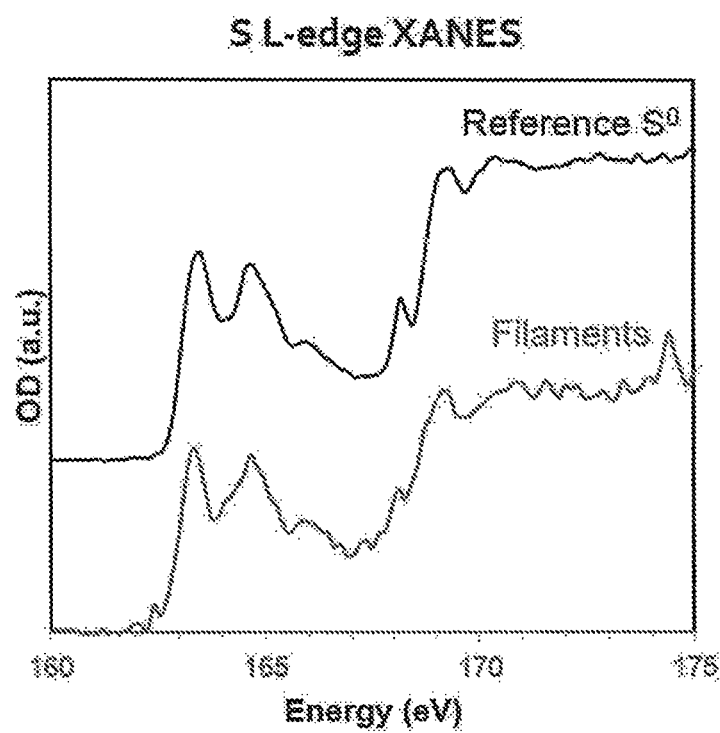
FIG. 7B is an exemplary S L-edge XANES analysis of a C/S composite compared to a reference for elemental sulfur.

The sulfur phase could be identified as $S^0$ in the cyclooctasulfur form (S8) based on bulk X-ray Absorption Near Edge Structure (XANES) spectroscopy at the S K-edge (FIG. 7A), as well as Raman spectromicroscopy (FIGS. 6B, 6E, 6H) and STXM/XANES analyses at the S L-edge (FIG. 7B).

S K-edge XANES spectra presented in FIG. 7A allow a qualitative comparison of the amount of $S^0$ produced in the absence and the presence of organic matter. The S K-edge XANES spectra of all the samples analyzed present peaks at 2472.6 and 2479.3 eV, corresponding to $S^0$, as well as peaks at 2481.2 and 2482.6 eV, corresponding to sulfonate and sulfate groups that are present in the polycarbonate filters on which the samples were deposited for the analyses. The relative contributions of these two components ($S^0$ versus filter) gives a comparative estimate of the amount of $S^0$ present in the samples. It is apparent that a smaller quantity of $S^0$ was formed in the gradient tube without any organics compared to the gradient tubes containing yeast extract and/or peptone.

Figure 8E:
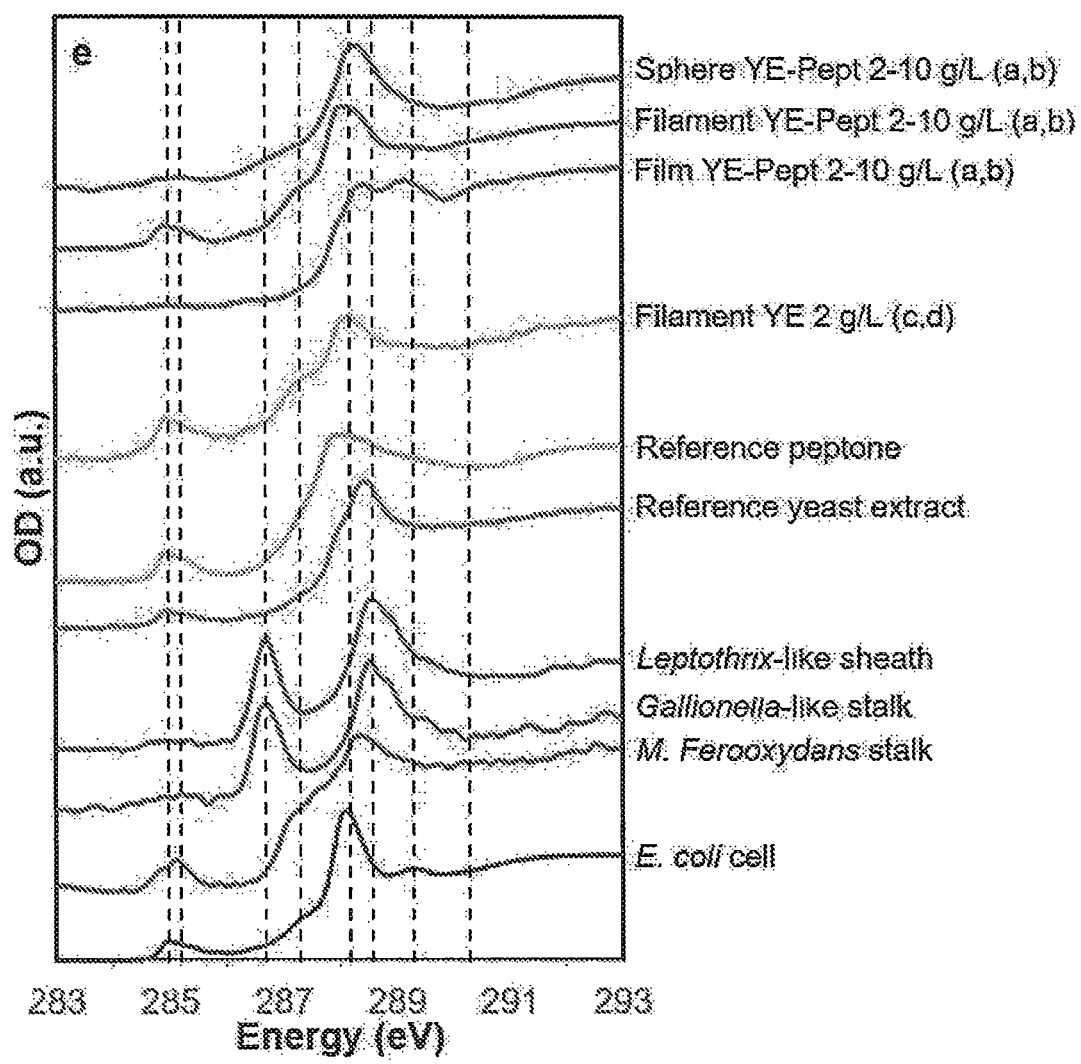
Figure 9A:
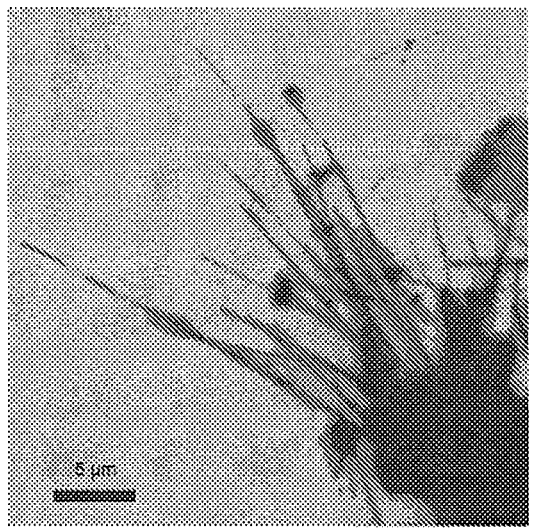
FIGS. 9A-9E are an exemplary STXM mapping of the C/S microstructures at the C K-edge and the S L-edge.
Figure 9A:
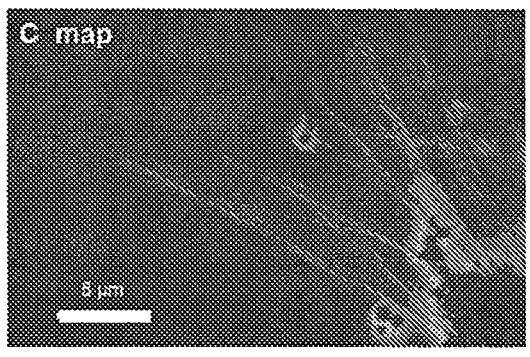
Figure 9B:
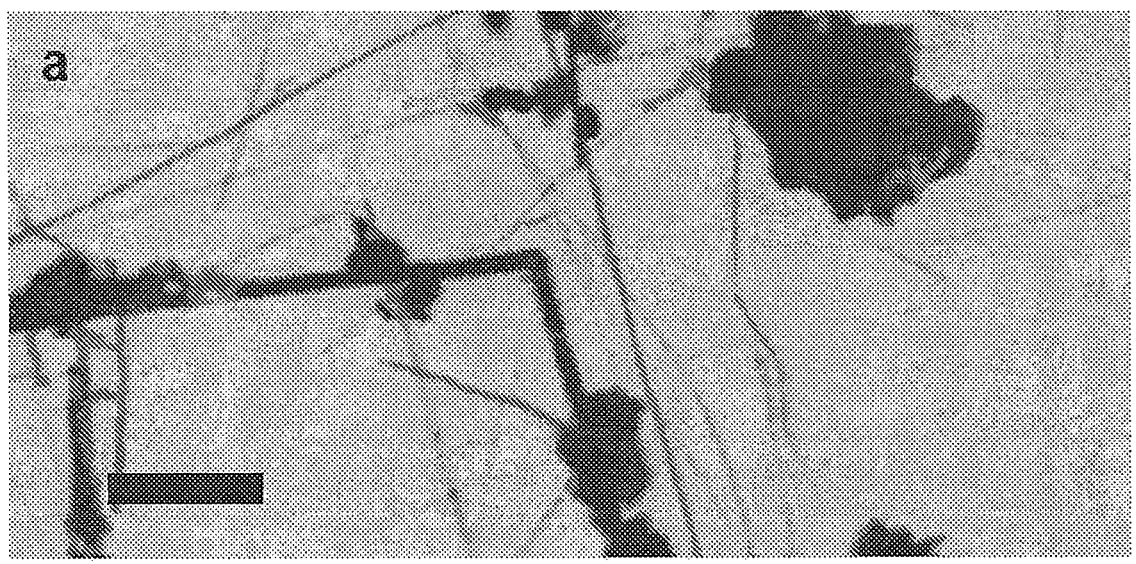
Figure 9C:
Figure 9D:
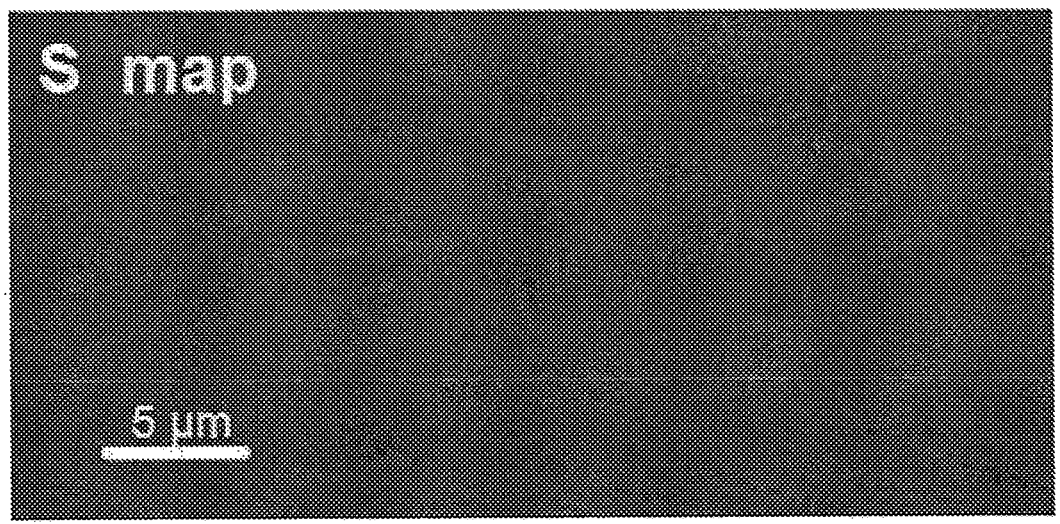
Figure 9E:

The carbon shells of the microstructures present complex organic compositions, as determined by STXM/XANES analyses at the C K-edge (FIGS. 8A-8E). Their spectra present peaks at 285.0 and 285.2 eV ($1s \rightarrow \pi^*_{C=C}$ transitions of unsaturated or aromatic C), 123 287.3 eV ($1s \rightarrow \sigma^*$ transitions of aliphatic C) and 288.2 eV ($1s \rightarrow \pi^*_{C=O}$ transitions in amide groups), and are relatively similar to the spectra of the yeast extract and peptone from which they were derived. (FIG. 8E). However, the C K-edge spectra of the microstructures do differ from the spectrum of the agarose film with which they are associated. More interestingly, the complex C K-edge composition of the organic carbon shell of the C/S microstructures is very similar to the to the composition of microbial cells, represented here by the spectrum of the bacterium *Escherichia coli*, as well as extracellular twisted stalks produced by the Fe-oxidizing bacterium *Mariprofundus ferrooxydans*.

The disclosures of each and every patent, patent application, and publication cited herein are hereby incorporated herein by reference in their entirety.

While the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of preparing a carbon/sulfur composite, wherein the composite comprises multidimensional carbon tubular or spherical networks associated with elemental sulfur, the method comprising:
    contacting (i) a first layer comprising at least one soluble organic compound and a salt solution and (ii) a second layer comprising a gel, a salt solution, and at least one sulfide source, wherein the second layer is substantially free of oxygen gas at the time of contacting; and
    directly exposing the first layer to an atmosphere comprising oxygen gas;
    whereby the composite is formed once the first layer and the second layer at least partially mix and react.

2. The method of claim 1, wherein the at least one soluble organic compound is at least one selected from the group consisting of peptone, yeast extract, casamino acids, glucose, cellobiose, glycine, and humic acids.

3. The method of claim 2, wherein the concentration of the at least one soluble organic compound in the first layer independently varies from about 0.1 g/L to about 25 g/L.

4. The method of claim 1, wherein the at least one sulfide source is at least one selected from the group consisting of $Na_2S$, $K_2S$, and FeS.

5. The method of claim 1, wherein the concentration of the at least one sulfide source in the second layer independently varies from about 100 nM to about 100 mM.

6. The method of claim 1, wherein, after contacting the first and second layers, an oxygen gas concentration gradient is formed within the first and second layers, wherein the oxygen gas concentration is higher in the first layer as compared to the second layer.

7. The method of claim 1, wherein, after contacting the first and second layers, a sulfide ion concentration gradient is formed within the first and second layers, wherein the sulfide ion concentration is higher in the second layer as compared to the first layer.

8. The method of claim 1, which does not comprise at least one step selected from the group consisting of sulfur melt incorporation and impregnation.

9. The method of claim 1, wherein at least one property selected from the group consisting of composite rigidity, extent of carbon/sulfur network formation in the composite and sulfur loading in the composite is controlled by independently varying the concentration or identity of the at least one soluble organic compound and at least one sulfide source in the layers.

10. The method of claim 1, wherein the composite comprises at least one structure selected from the group consisting of tubes, filaments, spheres, and platelets.

11. The method of claim 10, wherein at least one filament has a thickness ranging from about 10 nm to about 100 μm.

12. The method of claim 10, wherein at least one filament has a length ranging from about 1 μm to about 1,000 μm.

13. The method of claim 10, wherein at least one filament is rectilinear or twisted.

14. The method of claim 10, wherein at least one filament is branched.

15. The method of claim 14, wherein the at least one filament branches at an about 45° to about 90° angle.

16. The method of claim 1, wherein the composite comprises a tube in at least one form selected from the group consisting of helical, isolated, bundled, and arranged in perpendicular lattices.

17. The method of claim 1, wherein the composite comprises a sulfur-carbon sphere (SCS).

18. The method of claim 1, wherein the composite comprises elemental sulfur) ($S^0$).

19. The method of claim 18, wherein the elemental sulfur in the composite is in at least one form selected from the group consisting of amorphous sulfur, alpha-cyclooctasulfur ($\alpha$-$S_8$), and beta-cyclooctasulfur ($\beta$-$S_8$).

20. The method of claim 1, wherein the first layer is substantially free of oxygen gas at the time of contacting.

* * * * *